(12) United States Patent
Noritomi

(10) Patent No.: US 6,473,902 B1
(45) Date of Patent: Oct. 29, 2002

(54) METHOD AND APPARATUS FOR TRANSMITTING PROGRAMS

(75) Inventor: Masami Noritomi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/053,772

(22) Filed: Apr. 2, 1998

(30) Foreign Application Priority Data

Apr. 4, 1997 (JP) .......................................... P09-087075

(51) Int. Cl.[7] .............................. H04N 7/173; G06F 9/00; G06F 15/16
(52) U.S. Cl. .......................... 725/91; 725/114; 725/116; 709/100; 709/200; 709/201; 709/203
(58) Field of Search ............................... 725/91, 95–97, 725/114, 116; 709/100, 102, 200, 201, 203, 216–219

(56) References Cited

U.S. PATENT DOCUMENTS

| | | | | |
|---|---|---|---|---|
| 5,513,314 A | * | 4/1996 | Kandasamy et al. | ... 395/182.04 |
| 5,557,317 A | * | 9/1996 | Nishio et al. | ................... 348/7 |
| 5,574,934 A | * | 11/1996 | Mirashrafi et al. | ........... 395/800 |
| 5,583,561 A | * | 12/1996 | Baker et al. | ..................... 348/7 |
| 5,745,756 A | * | 4/1998 | Henley | ......................... 395/620 |
| 5,870,553 A | * | 2/1999 | Shaw et al. | ............. 395/200.49 |
| 5,928,327 A | * | 7/1999 | Wang et al. | ................. 709/217 |
| 5,940,594 A | * | 8/1999 | Ali et al. | ................ 395/200.33 |
| 6,085,253 A | * | 7/2000 | Blackwell et al. | ........... 709/235 |
| 6,378,129 B1 | * | 4/2002 | Zetts | ............................ 725/94 |

* cited by examiner

Primary Examiner—Andrew Faile
Assistant Examiner—Son P. Huynh
(74) Attorney, Agent, or Firm—Jay H. Maioli

(57) ABSTRACT

A method of image data transmission in which when the transmission of programs is changed and a desired program has to be copied from the main server to the cache server, the copying is carried out in a modified order of priority so as to increase the efficiency.

The controller 16 examines whether the video program inserted is "urgent" or not, and examines whether the video program being copied from the main server 4 to the cache server 5 is "urgent" or not. When "urgent", the controller 16 examines whether or not the video program inserted has a higher priority than the video program being copied. When so, the controller 16 stops the copying and starts the copying of the video signal inserted.

11 Claims, 25 Drawing Sheets

PLAY BACK

| NO. | START TIME H:M:S | ID | TITLE | S.O.M. H:M:S | DURATION H:M:S | STATUS |
|---|---|---|---|---|---|---|
| 1 | : : | 0201 | LIBRARY Mat-0201 | 03:04:53 | 00:00:15 | |
| 2 | : : | 0202 | LIBRARY Mat0202 | 03:05:41 | 00:00:15 | |
| 3 | : : | 0203 | LIBRARY Mat-0203 | 03:02:45 | 00:00:15 | |
| 4 | : : | 0204 | LIBRARY Mat-0204 | 03:02:13 | 00:00:15 | |
| 5 | : : | 0205 | LIBRARY Mat-0205 | -- : -- : -- | 00:00:15 | |
| 6 | : : | 0206 | LIBRARY Mat-0206 | 03:01:41 | 00:00:15 | |
| 7 | : : | 0207 | LIBRARY Mat-0207 | 03:01:25 | 00:00:15 | |
| 8 | : : | 0208 | LIBRARY Mat-0208 | 02:59:49 | 00:00:15 | |
| 9 | : : | 0209 | LIBRARY Mat-0209 | -- : -- : -- | 00:00:15 | |
| 10 | : : | 0201 | LIBRARY Mat-0201 | 03:04:53 | 00:00:15 | |
| 11 | : : | 0210 | LIBRARY Mat-0210 | 02:58:29 | 00:00:15 | |

| | | | COPY | | | |
|---|---|---|---|---|---|---|
| NO. | START TIME | ID | TITLE | S.O.M. | DURATION | STATUS |
| | H:M:S | | | H:M:S | H:M:S | |
| 1 | : : | 0201 | LIBRARY Mat-0201 | 03:04:53 | 00:00:15 | COPIED |
| 2 | : : | 0202 | LIBRARY Mat-0202 | 03:05:41 | 00:00:15 | COPIED |
| 3 | : : | 0203 | LIBRARY Mat-0203 | 03:02:45 | 00:00:15 | COPIED |
| 4 | : : | 0204 | LIBRARY Mat-0204 | 03:02:13 | 00:00:15 | COPIED |
| 5 | : : | 0205 | LIBRARY Mat-0205 | --:--:-- | 00:00:15 | NOT COPIED |
| 6 | : : | 0206 | LIBRARY Mat-0206 | 03:01:41 | 00:00:15 | COPIED |
| 7 | : : | 0207 | LIBRARY Mat-0207 | 03:01:25 | 00:00:15 | COPIED |
| 8 | : : | 0208 | LIBRARY Mat-0208 | 02:59:49 | 00:00:15 | COPIED |
| 9 | : : | 0209 | LIBRARY Mat-0209 | --:--:-- | 00:00:15 | NOT COPIED |
| 10 | : : | 0201 | LIBRARY Mat-0210 | 03:58:29 | 00:00:15 | COPIED |
| 11 | : : | 0210 | LIBRARY Mat-0211 | 02:58:13 | 00:00:15 | COPIED |

FIG.4

| NO. | AREA | ID | STATUS |
|---|---|---|---|
| 1 | URGENT | Mat-01 | COPIED |
| 2 | | Mat-02 | COPIED |
| 3 | | Mat-03 | COPIED |
| 4 | | Mat-A | NOT COPIED |
| 5 | | Mat-05 | COPIED |
| 6 | | Mat-06 | NOT COPIED |
| 7 | | Mat-07 | COPIED |
| 8 | NORMAL | Mat-08 | COPIED |
| 9 | | Mat-09 | COPIED |
| 10 | | Mat-10 | COPIED |
| 11 | | Mat-B | NOT COPIED |
| 12 | | Mat-12 | COPIED |
| 13 | | Mat-13 | COPIED |
| 14 | | Mat-14 | NOT COPIED |
| 15 | | Mat-15 | NOT COPIED |

FIG.10

| DELETE AREA | DELETE ID | NUMBER OF DELETIONS | SUM OF DELETE AREAS |
|---|---|---|---|
| A | Mat-302<br>Mat-303<br>Mat-304 | 3 | 24 |
| B | Mat-306<br>Mat-307 | 2 | 11 |
| ⋮ | ⋮ | ⋮ | ⋮ |

FIG.16

| | NO. | ID | STATUS |
|---|---|---|---|
| IN THE ORDER OF PRIORITY<br><br>HIGH<br>↑<br>│<br>│<br>│<br>↓<br>LOW | 1 | Mat - A | COPIED |
| | 2 | Mat - B | COPIED |
| | 3 | Mat - C | NOT COPIED |
| | 4 | Mat - D | COPIED |
| | 5 | Mat - E | NOT COPIED |
| | 6 | Mat - F | NOT COPIED |
| | 7 | Mat - G | COPIED |
| | 8 | Mat - H | NOT COPIED |
| | 9 | Mat - I | COPIED |
| | 10 | Mat - J | COPIED |
| | 11 | Mat - K | COPIED |
| | 12 | Mat - L | NOT COPIED |
| | 13 | Mat - M | NOT COPIED |
| | 14 | Mat - N | NOT COPIED |
| | . . . . . . . . | . . . . . . . . | . . . . . . . . |

| IN THE ORDER OF PRIORITY | NO. | ID | STATUS | DESCRIPTION |
|---|---|---|---|---|
| HIGH | 1 | Mat-A | COPIED | |
| ↕ | 2 | Mat-B | COPIED | |
| | 3 | Mat-C | COPY ERROR-1 | SHORT PERIOD AFTER ERROR |
| | 4 | Mat-D | COPIED | |
| | 5 | Mat-E | COPY ERROR-2 | LONG PERIOD AFTER ERROR |
| | 6 | Mat-F | NOT COPIED | INSERTED IN TRANSMISSION DATA BY EDIT |
| | 7 | Mat-G | COPIED | |
| | 8 | Mat-H | NOT COPIED (EX-COPY ERROR-1) | TO BE COPIED AS SHORT PERIOD ELAPSED |
| | 9 | Mat-I | COPIED | |
| | 10 | Mat-J | COPIED | |
| | 11 | Mat-K | COPIED | |
| | 12 | Mat-L | NOT COPIED | COPY NOT COMPLETED |
| | 13 | Mat-M | NOT COPIED | COPY NOT COMPLETED |
| LOW | 14 | Mat-N | NOT COPIED | COPY NOT COMPLETED |
| | ... | ... | ... | |

| PLAYBACK-1 | PLAYBACK-2 | PLAYBACK-3 | DESCRIPTION |
|---|---|---|---|
| Mat-101 | Mat-201 | Mat-301 | DELETION NOT ALLOWED |
| Mat-102 | Mat-202 | Mat-302 | |
| Mat-103 | Mat-203 | Mat-303 | |
| Mat-104 | Mat-204 | Mat-304 | |
| Mat-105 | Mat-205 | Mat-305 | SUM OF DURATIONS WITHIN LIMIT |
| Mat-106 | Mat-206 | Mat-306 | |
| Mat-107 | Mat-207 | Mat-307 | |
| Mat-108 | Mat-208 | Mat-308 | LISTED IN TRANSMISSION DATA, SUM OF DURATIONS OUTSIDE LIMIT (GREATER) |
| Mat-109 | Mat-209 | Mat-309 | |
| Mat-110 | Mat-210 | Mat-310 | |
| Mat-111 | Mat-211 | Mat-311 | DELETION ALLOWED |
| Mat-112 | Mat-212 | Mat-312 | |
| Mat-113 | Mat-213 | Mat-313 | |
| Mat-114 | Mat-214 | Mat-314 | |
| Mat-115 | | Mat-315 | NOT LISTED IN TRANSMISSION DATA |
| | | Mat-316 | |
| | | Mat-317 | |

FIG.26

METHOD AND APPARATUS FOR TRANSMITTING PROGRAMS

BACKGROUND OF THE INVENTION

1. Field of the Invention

The present invention relates to a method and an apparatus for making desired copies from a plurality of video programs stored in a main server and transmitting the copies of the video programs from a cache server.

2. Description of Related Art

As the transmission of data such as over CATV (cable television) systems has been realized in multiple channels, the demand for recording or playing back two or more video/audio data in one single video/audio data recorder/player apparatus and also, simultaneous recording and playing back of the video/audio data is increased. For satisfying the demand, an advanced apparatus, called a video server (or an AV (video and/or audio) server), is recently introduced for recording and playing back the video/audio data on a random access recording medium such as a hard disk.

It is commonly desired for increasing the quality of reproduced images and sounds that such a video server as employed in a broadcasting station has a large storage capacity for storage of long lasting data and is compatible to a higher rate of data transmission. For the purpose, the data recorder/player apparatus is provided with a number of hard disks (abbreviated to HDs) which can save a large quantity of video/audio data and allow parallel processing of the same. In addition to improvement of the data transmission rate and increase of the storage capacity, an attempt is made in which parity data is saved which can be used for maintaining the operational reliability when any of the HDs has a fault. Even if the number of channels determined by the requirements at a broadcasting station, e.g. of programs and transmission modes, is varied, that type of the video server permits simultaneous transmission over the channels of a material data which comprises multiple video and audio signals and are saved in a discrete manner or playing back of the same at intervals of a time of delay on the channels and can act as a multi-channel video server applicable to a wide range of equipment including a VOD (video-on-demand) system and an NVOD (near video-on-demand) system.

In practice, it is known that video programs to be transmitted for broadcasting are stored in a video server and when requested, desired ones of them are temporarily saved in another video server before distributed to each subscriber. It is noted that the former video server for storage of all the video programs is termed as a main server and the latter for temporal storage of desired video programs called as a cache server.

7382 An apparatus for, upon request, automatically transferring (or copying) a desired one of the video programs from the main server to the cache server which in turn distributes the video program to clients is known as an automatic copying system.

In such an automatic copying system, when not saving a video program desired for transmission to a home client, the cache server can receive a copy of the desired video program from the main server and deliver it to the home client.

In common, when the cache server carries no programs, the video programs are copied in the order of transmission from the cache server.

If the order of transmission from cache server to clients is changed, the order of copying the video programs has to be changed. Otherwise, some of the video programs to be transmitted are not saved in the cache server and fail to be distributed to the clients.

Also, when the insertion of another video program to be copied and transmitted according to transmission change is made, it interrupts copying of the current video program and thus the action of the main server, the cache server, and their relevant controllers hence declining the efficiency of data processing.

SUMMARY OF THE INVENTION

The present invention is directed in view of the foregoing drawbacks and its object is to provide a method of image data transmission in which when the transmission of programs is changed and a desired program has to be copied from the main server to the cache server, the copying is carried out in a modified order of priority so as to increase the efficiency.

According to the present invention, a method of transmitting programs, each comprising a group of data, which are stored in a first saving means and copied to a second saving means before distributed out from the second saving means, comprising the steps of: saving a database file which includes data of the programs saved in the second saving means, a playback file which includes data of transmission of the programs saved in the second saving means, and a copy file indicative of programs in the order of transmission which are listed in the playback file but not saved in the database file; transferring to the first saving means a first copy demand for copying the programs specified by the copy file; copying the programs from the first saving means to the second saving means in response to the first copy demand; when the playback file is changed, examining whether the video program specified by the copy file is to be transmitted urgently or not; when a program added and/or modified is to be transmitted urgently and earlier than the current program being copied to the second saving means, transferring to the first saving means a second copy demand for interrupting the copying of the current program and copying the program added and/or modified at priority; and copying the program added and/or modified from the first saving means to the second saving means in response to the second copy demand.

BRIEF DESCRIPTION OF THE DRAWINGS

FIG. 3 is an explanatory view showing the playback file displayed on the screen of a monitor;

FIG. 4 is an explanatory view showing a copy file displayed on the screen of a monitor;

FIG. 10 is an explanatory view showing a content of the copy file when the video programs are classified to urgent and normal;

FIG. 16 is a diagram of a content of the space allocation file;

FIG. 17 is a view showing a primary part of the copy file;

FIG. 19 is a view showing a primary part of the copy file;

FIG. 26 is a schematic view of the delete file.

DETAILED DESCRIPTION OF PREFERRED EMBODIMENTS

Figure 1:
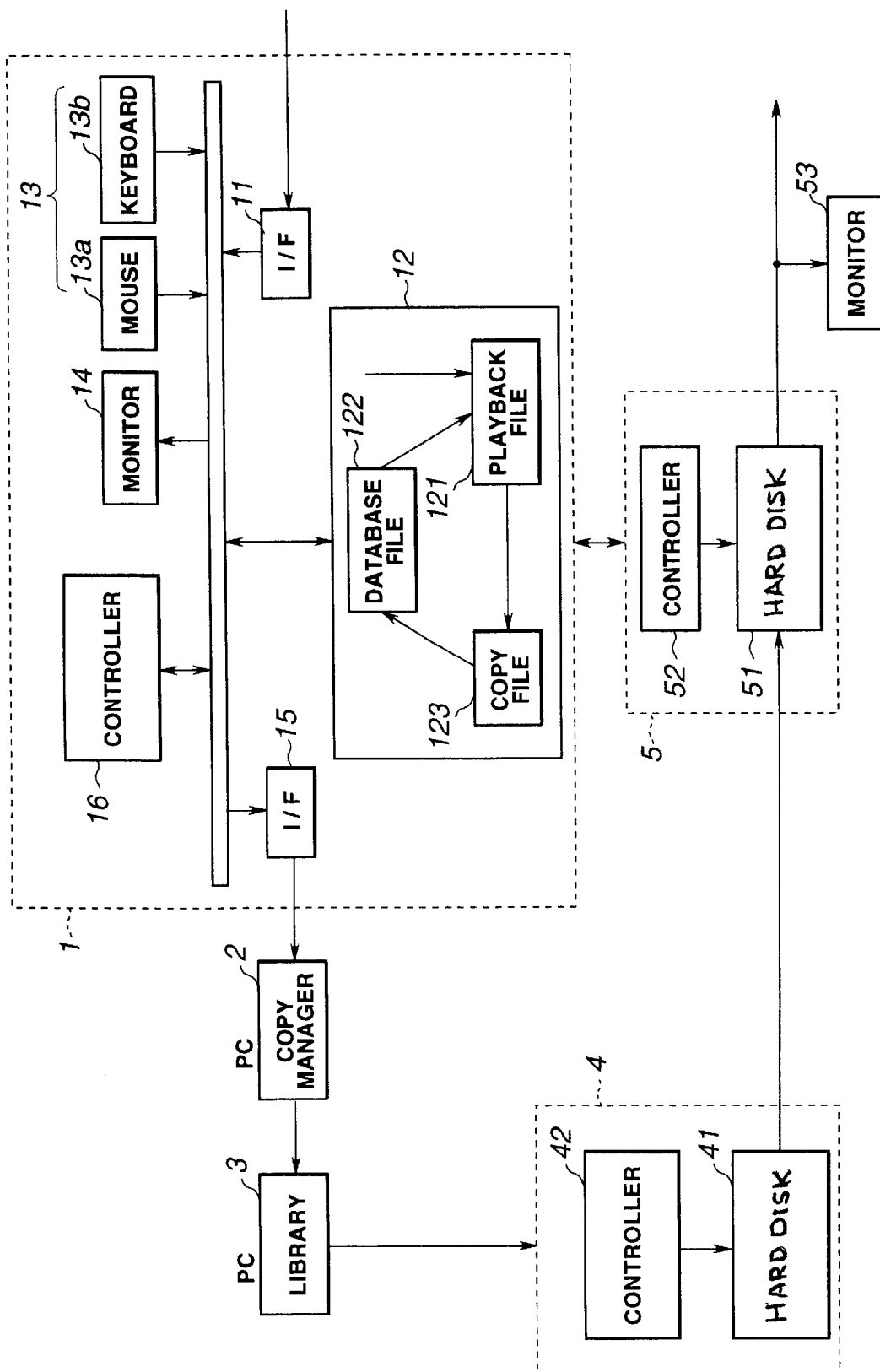
FIG. 1 is a block diagram of a practical arrangement of an automatic copy system according to the present invention.

Preferred embodiments of the present invention will be described in more detail referring to the accompanying drawings. The present invention is applicable to such an automatic copy system as shown in FIG. 1. The automatic copy system is commonly used in a television broadcasting station. More particularly, the automatic copy system in this embodiment includes a main server provided for storing a number of (contents of) video programs and when requested, delivering corresponding programs to data cache servers which in turn save (copies of) the programs before distribute them to end users.

The automatic copy system in the embodiment comprises, as shown in FIG. 1, a personal computer 1 (referred to as a control PC hereinafter) for controlling the cache servers, a copy manager 2, a library 3, the main server 4, and the cache server 5.

The control PC 1 is provided for controlling data saved in the cache server 5. The control PC 1 and the cache server 5 are operated in a combination. If a plurality of the cache servers 5 are provided but not shown, the same number of the control PCs 1 are needed. When the control PC 1 detects that a desired program is not saved in the cache server 5, it produces and delivers a copy demand signal for demanding a copy of the desired program to the main server 4 via the copy manager 2 and the library 3.

The cache server 5 comprises a hard disk 51 for saving (a copy of) video programs supplied from the main server 4 and a controller 52 for controlling the hard disk 51. The hard disk 51 may have a so-called PAID structure including a plurality of hard disks or a non-linear accessible recording medium such as a DVD device or an MD device.

The copy manager 2 is also a personal computer connected normally to a plurality of the control PCs 1 for transmitting their copy demand signals to the library 3 in a particular order of priority. In FIG. 1, the copy manager 2 is connected to the single control PC 1 though it can be communicated with two or more of the control PCs 1.

The copy demand signal received by the copy manager 2 from the control PC 1 is then transferred via the library 3 to the main server 4 for demanding delivery of the desired program. In synchronizing with this action, the cache server 5 is actuated by the copy manager 2 to save a copy of the desired program. Upon receiving a copy interrupt signal from the control PC 1, the copy manager 2 directs the main server 4 and the cache server 5 to stop the transfer of a copy of the program from the main server 4 to the cache server 5.

The library 3 is also a personal computer arranged responsive to the copy demand signal from the copy manager 2 for directing the main server 4 to transmit the desired program stored in the main server 4 to the cache server 5. In general, the main server 4 holds a complete set of the programs.

The main server 4 comprises a hard disk 41 in which the complete set of the programs are stored and a controller 42 for controlling the hard disk 41 in accordance with a control action of the library 3. Although the hard disk 41 is provided for storage of the video programs in the embodiment, it is of no limitation. For example, a known library management system (LMS) may be used which includes an automatic cassette exchange mechanism for selecting a desired video cassette from its storage and transferring it to a playback device such as VTR.

As shown in FIG. 1, the control PC 1 comprises an interface 11 for receiving data such as playback files which contain sequences, start time, broadcasting date, and other relevant information of the video programs supplied from the cache server 5, a memory 12 for saving the playback files and other data, an operating unit 13 having a mouse 13a and a keyboard 13b, a monitor 14, an interface 15 for transmitting the copy demand signal, and a controller 16 for rewriting the files saved in the memory 12. The playback files will be explained later in more detail.

The memory 12 includes a playback file 121, a database file 122, and a copy file 123. The playback file 121 can be added with other data from the interface 11 or modified by an action of the operating unit 13.

The monitor 14 is provided for displaying data of the playback file 121, the database file 122, and the copy file 123 saved in the memory 12 and also used for trimming the start of message (SOM) and the end of message (EOM) of each video program copied from the main server 4 to the cache server 5 on a trimming window or still image.

The interface 15 in response to a control action of the controller 16 transmits the copy demand signal to the copy manager 2 and receives the end-of-copy signal from the copy manager 2 which is indicative of the completion of copying action.

Figure 2:
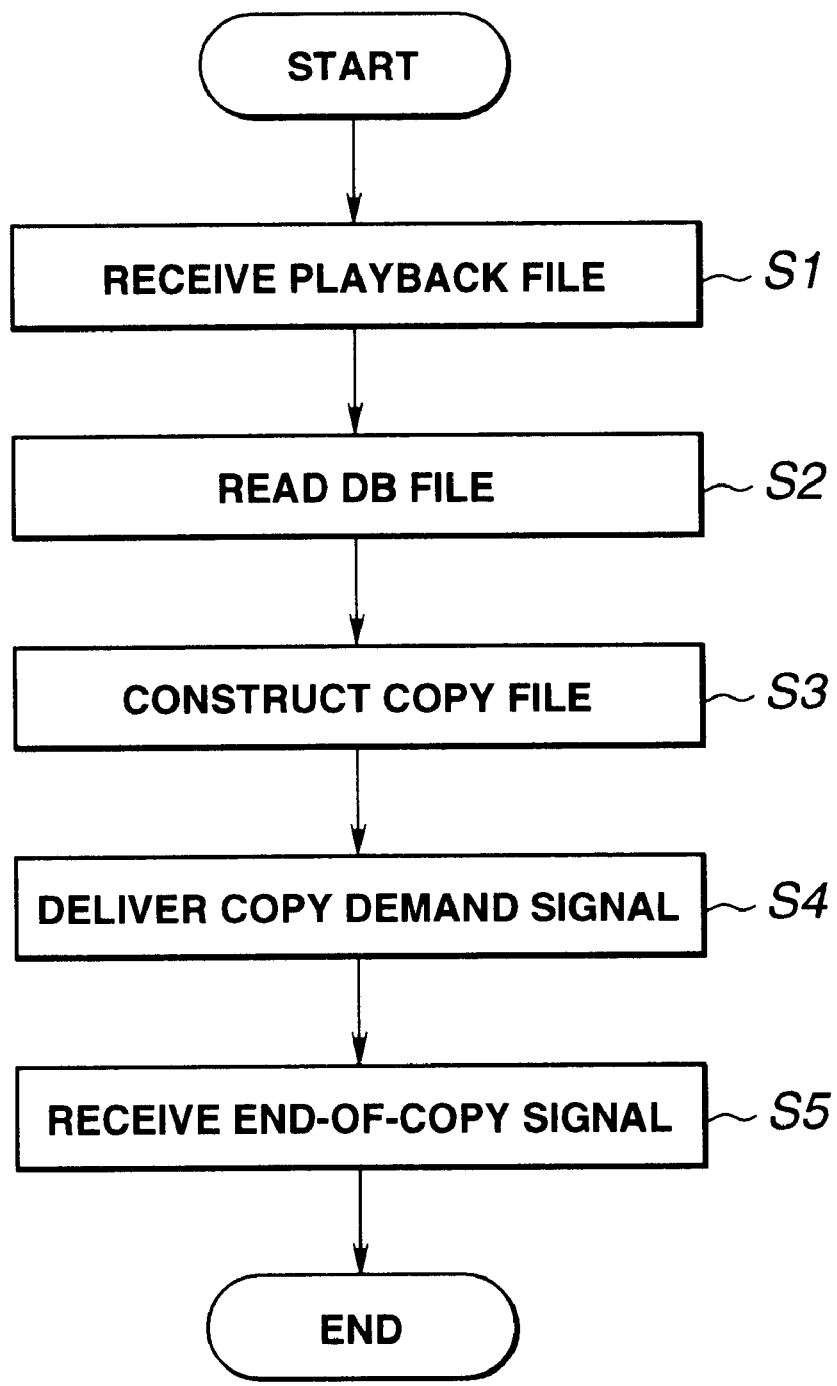
FIG. 2 is a flowchart showing an action of a control PC when receiving data from a playback file.

The operation of the automatic copy system starts with the control PC 1 receiving the playback file 121 via the interface 11 and a procedure beginning from Step S1 shown in FIG. 2 follows. This procedure of the control PC 1 lasts from receipt of the playback file 121 to receipt of the end-of-copy signal.

The controller 16 in the control PC 1 upon receiving data of playback file from the interface 11 constructs the playback file 121 and saves it in the memory 12 (Step S1).

The playback file 121 contains the video program titles saved in an order of transmission from the cache server 5 to users, as shown in FIG. 3. More specifically, the playback file 121 is prepared for identifying the video programs released from the cache server 5. As shown in FIG. 3, the playback file 121 includes "No." 300 indicative of an order of transmission of the video programs from the cache server 5, "Start Time" 301 representing the start of transmission (an absolute time), "ID" 302 denoting the ID number of each video programs to be transmitted, "Title" 303 indicating the title of each video program, "S.O.M." 304 representing the start of a record on the hard disk 51, "Duration" 305 representing the playback duration of each video program, and "Status" 306 denoting the status of each video program. The playback file 121 shown in FIG. 3 allows the video programs to be transmitted from the cache server 5 in a sequence of ID 0201 to 0209, 0201, and 0210.

The controller 16 upon constructing the playback file 121 accesses the database file 122 to examine whether or not the video programs requested for transmission from the cache server 5 to the users have been copied and saved in the hard disk 51 (Step S2). The controller 16 periodically checks the database file 122 to construct an updated version of the playback file 121.

The database file 122 includes all data of copies of the video programs stored in the hard disk 51. It is examined by the controller 16 whether or not copies of the video programs Mat-0201, Mat-0202, . . . listed in the playback file 121 have been produced and saved in the hard disk 5.

The controller 16 after examining whether the video programs have been copied constructs the copy file 123 including a set of other video programs than those listed in the playback filer 121 (Step S3).

The copy file 123 indicates whether the video programs to be transmitted from the cache server 5 have been copied or not. More specifically, the copy file 123 includes "No." 401 indicative of an order of transmission of the video programs from the cache server 5 to users, "Start Time" 402 representing the start of transmission (an absolute time), "ID" 403 denoting the ID number of each video programs to be transmitted, "Title" 404 indicating the title of each video program, "S.O.M." 405 representing the start of a record on the hard disk 51, and "Duration" 406 representing the recorded length of each video program, as shown in FIG. 4. Also, the copy file 123 carries "Status" 407 which is classified into "copied" and "not copied" denoting that a copy of each video program has been saved in the hard disk 51 and not saved, respectively. Other statuses could be provided, such as, "copying" denoting that the copying action is under way and "copy error 1" and "copy error 2" denoting that errors have occurred. These other statuses are not shown in FIG. 4. The copy file 123 is updated at given intervals of time according to the change of the data in the playback file 121. The video programs listed at the top of the copy file 123 have higher priority and their copies are produced at the order of priority. In FIG. 4, the video programs Mat-0205, 0209, and AS lower are copied at first priority starting from Mat-0205, then Mat-0209 and so on.

The controller 16 thus produces and delivers the copy demand signal for making a copy of the video program of the "not copied" status according to the order of priority to the copy manager 2 via the interface 15 (Step S4).

The copy manager 2 transfers the copy demand signal to the library 3 to instruct the relevant data including the title and the duration of the video program. More specifically, the copy manager 2 actuates the hard disk 41 via the library 3 and the controller 42 for transmission of the video program and simultaneously, drives the hard disk 51 via the control PC1 and the controller 52 for recording a copy of the video program. As the result, the video program saved in the main server 4 is copied in the cache server 5. The synchronization between playback on the hard disk 41 and recording on the hard disk 51 is not limited to the above described action. For example, the program is transferred to the hard disk 51 upon the hard disk 41 generating a pulse signal and recorded when the hard disk 51 detects the pulse signal at its pulse detector circuit.

When acknowledging that the video program transmitted from the hard disk 41 has been recorded on the hard disk 51, the copy manager 2 delivers the end-of-copy signal to the control PC 1. Upon receiving the end-of-copy signal (Step S5), the controller 16 in the control PC 1 shifts the status in the copy file 123 from "not copied" to "copied" to register the end of copying the video program. Also, when the controller 16 registers the end of copying the video program to the database file 122, its action is terminated. If another video program of "not copied" status is found in the copy file 123, its copying action follows according to the order of priority.

Figure 5:
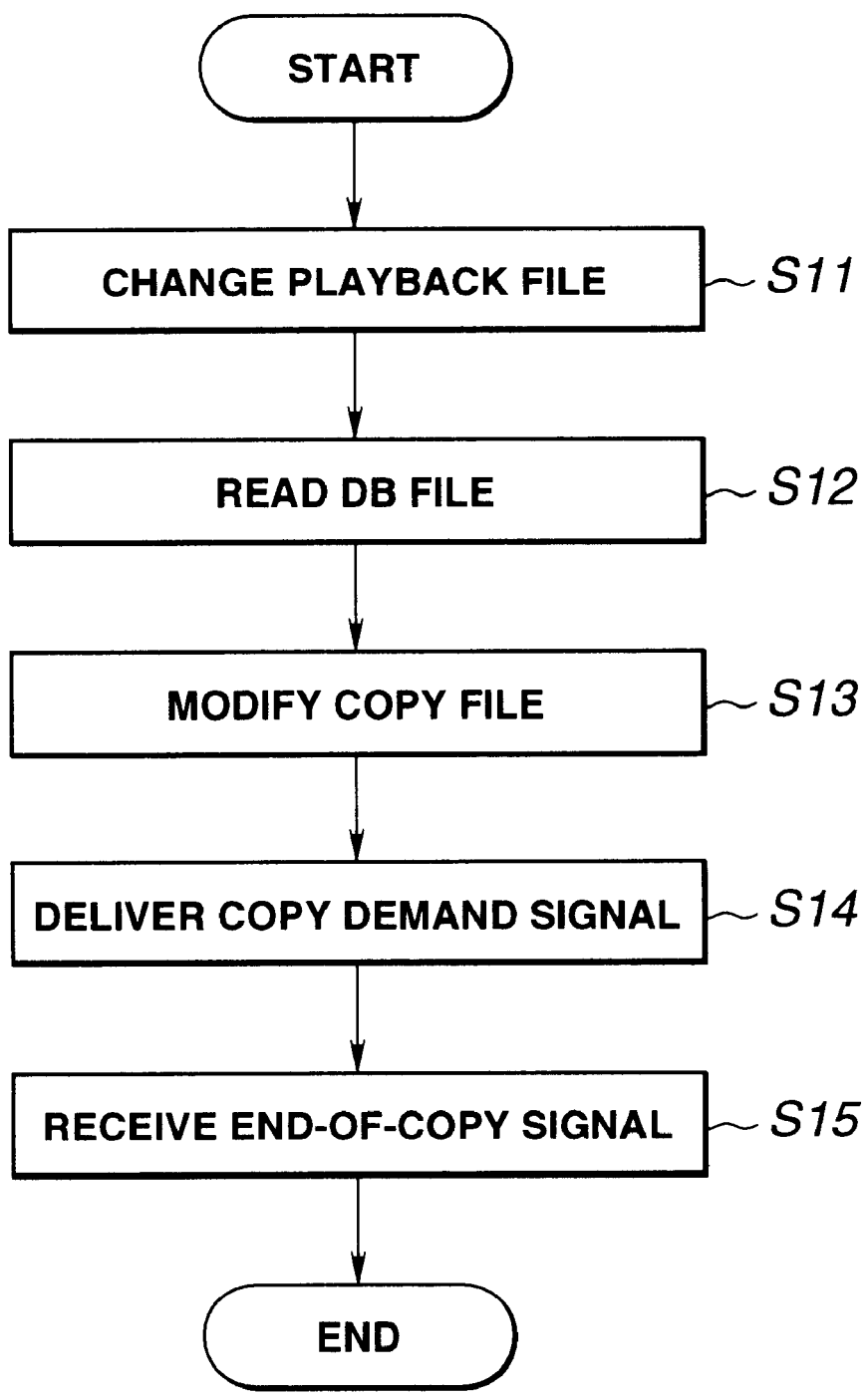
FIG. 5 is a flowchart showing an action of the control PC when the playback file has been modified.

The action of the control PC 1 for updating the copy file is now explained referring to FIG. 5. By operating through the operating unit 13, the video program to be released from the cache server 5 can easily be modified or changed to another.

The controller 16 updates the playback file 121 according to settings of the operating unit 13 (Step S11). The controller 16 then accesses the database file 122 to examine whether or not a copy of the video program to be transmitted from the cache server 5 to a user is saved in the hard disk 51 (Step S12). It may be examined by the controller 16 whether all the video programs listed in the playback file 121 are copied or the video program which has been added or modified is copied.

The controller 16 adds or modifies the video programs in the copy file 123 and also, determines its status, "copied" or "not copied", on the hard disk 51 (Step S13). The controller 16 then delivers the copy demand signal via the interface 15 to the copy manager 2 for requesting the production of a copy of the video program of "not copied" status not saved on the hard disk 51 (Step S14). In those steps, copies of the video programs saved in the main server 4 are saved in the cache server 5.

This is followed by providing the end-of-copy signal from the copy manager 2 to the controller 16 (Step S15). The controller 16 then shifts the status in the copy file 123 from "not copied" to "copied" and registers the completion of copying the video program. Also, the video program is registered in the database file 122 before the copying action is terminated.

As set forth above, the playback file 121 saving the title of video programs to be transmitted from the cache server 5 to users, the database file 122 saving main data of the video programs transferred from the hard disk 51, and the copy file 123 saving data indicating whether the video program to be transmitted from the cache server 5 has been copied or not are all installed in the memory 12. Since one of the files is updated at equal intervals of a time depending on the other files, any change of data to be transmitted from the cache server 5 to a user can be accepted.

More particularly, the present invention eliminates the need of controlling and calculating in a combination data to be transmitted from the cache server 5 to users, data copied and saved in the cache server 5, and data to be received by the cache server 5. Also, the hard disks 41 and 51 can be controlled without any change and the data to be transmitted out will easily be modified with no change of the arrangement of the system. The means for saving the video programs is not limited to the hard disk 41 of the embodiment but may be implemented by LMS equipped with an automatic cassette changer.

A modification of the system where the copy manager 2 is connected to more than one or explicitly, three of the control PCs 1a, 1b, and 1c via three channels will be described referring to FIG. 6. Though not shown in FIG. 6, the library 3, the main server 4, the cache server 5 are identical to those shown in FIG. 1. The description is made with a pair of the control PC 1a and the cache server 5a for ease of understandings while other pairs of the control PC 1b and the cache server 5b and the control PC 1c and the cache server 5c are operated with equal theory.

The control PC 1a includes a memory 12a which comprises three playback files PB1, PB2, and PB3, a database file DB, and three copy files COPY1, COPY2, and COPY3 for controlling the copying action of the cache server 5a.

The three playback files PB and the three copy files COPY are provided corresponding to three channels of a hard disk 51a in the cache server 5a. The playback file PB1 carries relevant data of a program to be transmitted along the first channel of the hard disk 51a, the playback file PB2 along the second channel, and the playback file PB3 along the third channel. The copy file COPY1 indicates whether the video program listed in the playback file PB1 is copied or not in the cache server 5a. The copy file COPY2 corresponds to the playback file PB2 and the copy file COPY3 corresponds to the playback file PB3. The database file DB includes a list of copies of the video programs saved in the hard disk 51a and is functionable in a single unit.

Each combination of the playback file PB, the database file DB, and the copy file COPY is connected to a corresponding one of the three channels for independent action. Over each of the channels, the steps S1 to S5 and S11 to S15 are executed. The controller 16 accesses the database file DB periodically to construct an updated version of the playback file PB1. Also, the copy file COPY1 is updated at equal intervals according to the updated playback file PB1. The same is carried out on the playback files PB2 and PB3 and the copy files COPY2 and COPY3.

Accordingly, when a number of the channels are provided in the cache server 5a, they are connected to their respective playback files PB and the copy files COPY hence permitting the video program at each channel to be examined whether it has been copied or not before transmitted along the channel. This eliminates the need of examining whether desired video programs have been copied or not and controlling the copying action over all the channels at once. Therefore, the system will be simplified in construction and accept a multi-channel link of the cache server 5a without difficulty.

Figure 7:
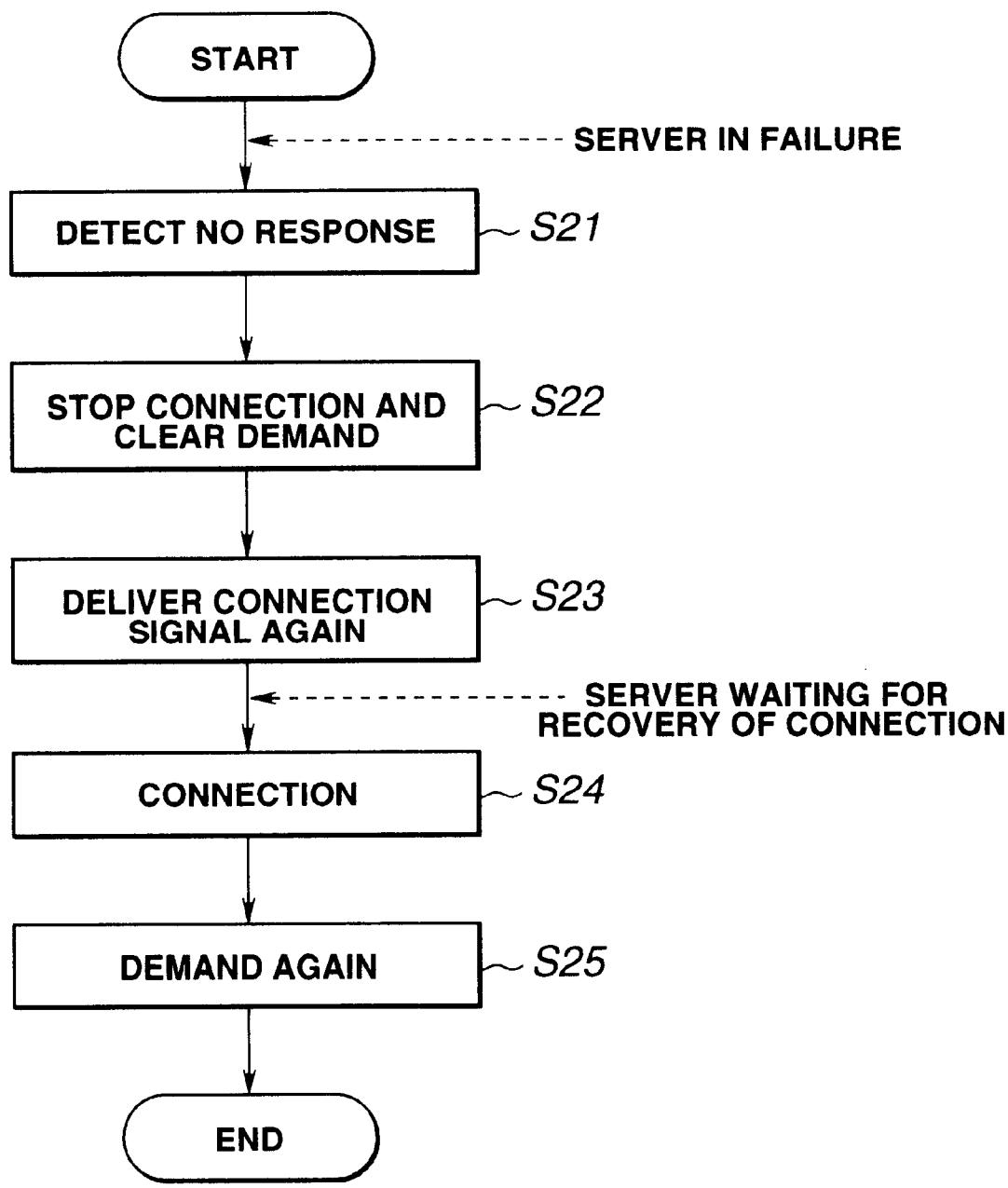
FIG. 7 is a flowchart showing the action of a client when a server has a fault.

A procedure of, if any of the control PC 1, the copy manager 2, and the library 3, and the other components has an error, restarting the system without downtime will be described referring to FIGS. 7 and 8 as well as FIG. 1.

When the control PC 1 delivers the copy demand signal to the copy manager 2, the control PC 1 acts as a client and the copy manager 2 acts as a server. If the copy manager 2 has a fault, the control PC 1 starts the procedure from S21 shown in FIG. 7.

The control PC 1 when receiving no response in a given period from the copy manager 2 after delivering the copy demand signal to the copy manager 2 (Step S21) disconnects the copy manager 2 and cancels the copy demand signal (Step S22). When the response is made, the procedure continues. With the cache server 5 having two or more channels and thus the control PC 1 having a corresponding number of the copy files COPY, the copy demand signal of interest has to be provided with an identifier in order to discriminate it from the copy command signal of the other copy file COPY.

The control PC 1 then repeats transmission of connection signal to the copy manager 2 for reconnection with the copy manager 2 (Step S23). If the fault is removed, the copy manager 2 is returned to its normal mode and stands by for receiving the connection signal from the control PC 1. When the copy manager 2 receives the connection signal, its connection to the control PC 1 is recovered (Step S24). Then, the control PC 1 delivers again the copy command signal to the copy manager 2 (Step S25).

Figure 8:
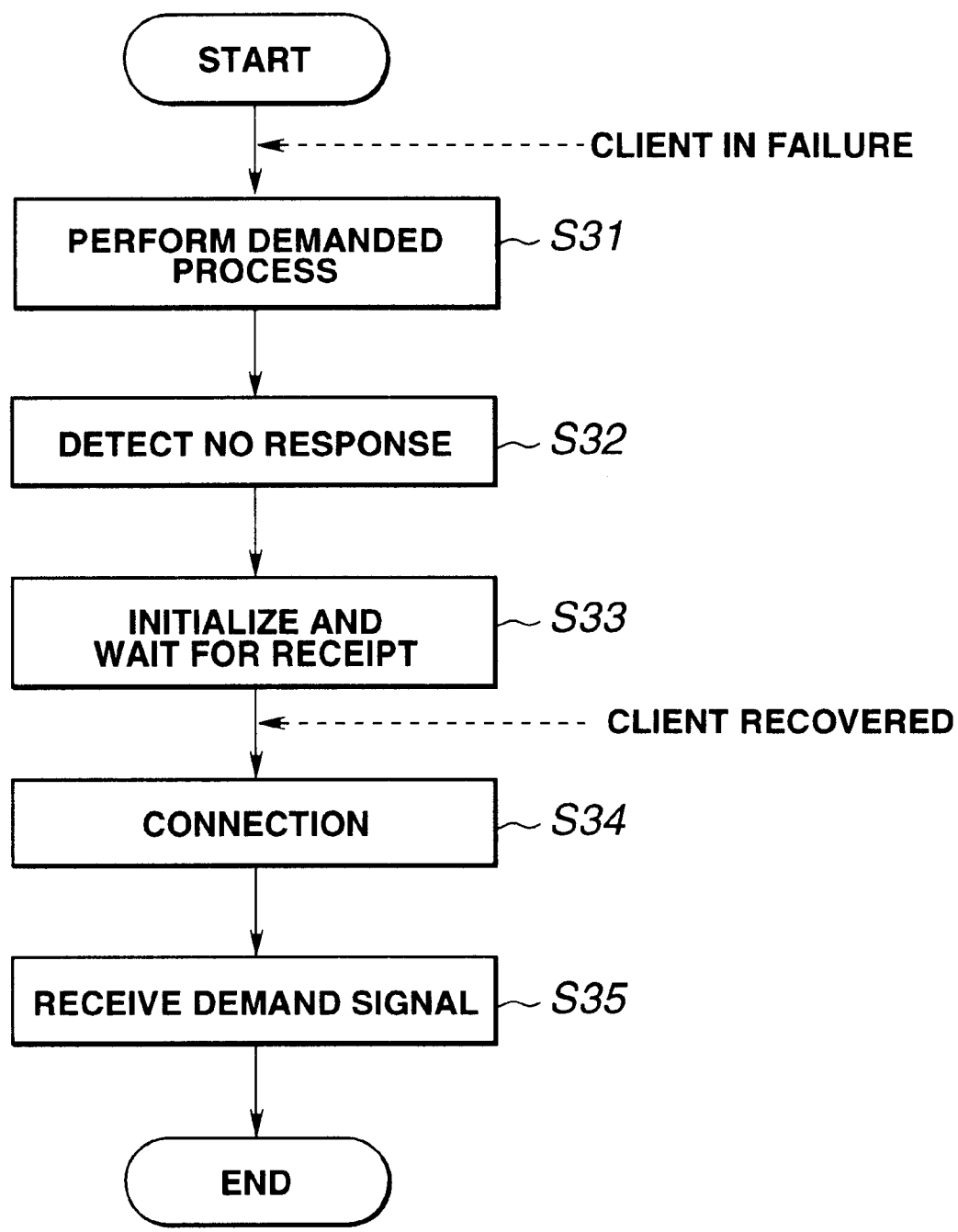
FIG. 8 is a flowchart showing the action of the server when the client has a fault.

If the control PC 1 acting as the client has a fault, the copy manager 2 starts the procedure from S31 shown in FIG. 8.

The copy manager 2 when receiving a control signal before the control PC 1 has a fault carries out the action determined by the control signal (Step S31). For example, in response to the copy command signal for a desired video program from the control PC 1, the copy manager 2 directs via the library 3 the cache server 5 to transmit the video signal.

Simultaneously, the copy manager 2 delivers a control signal to the control PC 1 for directing the cache server 5 to receive a copy of the video program. However, the control PC 1 has the fault and does not respond to the control signal. The copy manager 2 detects that no response is made by the control PC 1 in a given period and judges that the control PC 1 has a fault (Step S32).

Upon judging that the control PC 1 has the fault, the copy manager 2 initializes itself and stands by for receiving a connection signal from the control PC 1 (Step S33). When the fault is removed, the control PC 1 is returned to normal and delivers the connection signal to the copy manager 2. In response to the connection signal from the control PC 1, the copy manager 2 in its standby state recovers connection with the control PC 1 (Step S34). The control PC 1 when judging that the connection is recovered delivers again the same copy demand signal which is then received by the copy manager 2 (Step S35).

As set forth above, if the server has a fault, the client disconnects the communication with the server and then delivers a connection signal to the server continuously. If the client has a fault, the server initializes itself and waits for receiving a connection signal from the client. Accordingly, in case that any of the control PC 1, the copy manager 2, and the library 3 has an error, it can individually be corrected for recovery of the entire system while the rest of them remains intact. For example, the copy manager 2 or the library 3 has a fault, the other components in the system remain operable; i.e. the cache server 5 continues to transmit the video program to a user without interruption. Even if the cache server 5 has a number of channels, its transmission will never be interrupted with the playback files PB in the control PC 1 remaining intact.

The role of the client or the server may be determined by the connection relationship between the components. For example, the copy manager2 acts as the server when connected to the control PC 1 and as the client when connected to the library 3.

Figure 11:
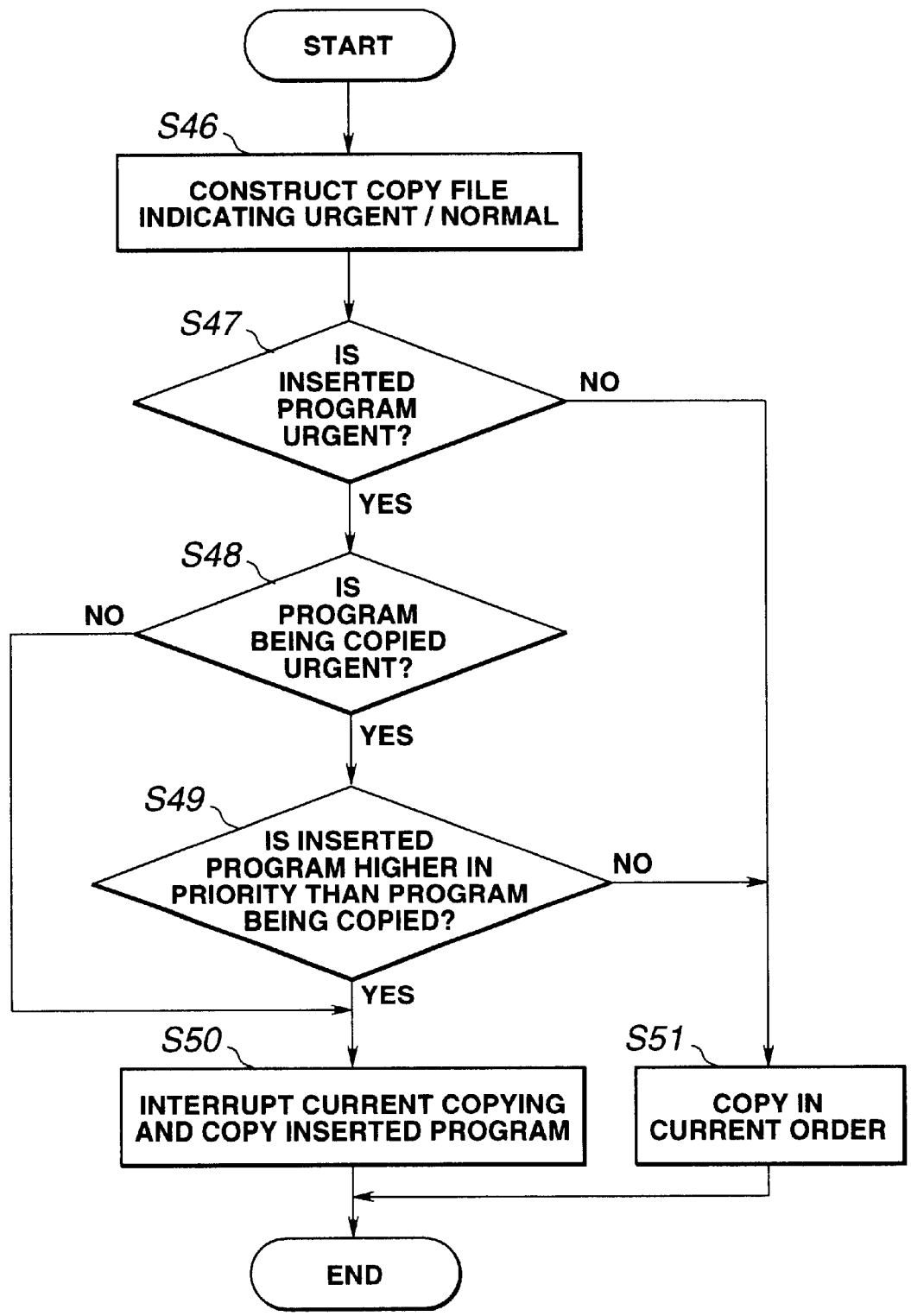
FIG. 11 is a flowchart of performing a copying action in accordance with the content of the copy file.

A procedure of, when the video program transmitted from the cache server 5 to users is modified or replaced with another, copying the another program at efficiency through examining its classification, "urgent" and "normal" will be described referring to FIGS. 9 to 11 as well as FIG. 1.

It is assumed that the video program to be transmitted is replaced with another and the another video program is examined whether it is transmitted in an "urgent" term or a "normal" term from the cache server 5.

The copy file 123 shown in FIG. 4 includes the video programs arranged in an order (of priority) for transmission from the cache server 5.

Figure 9:
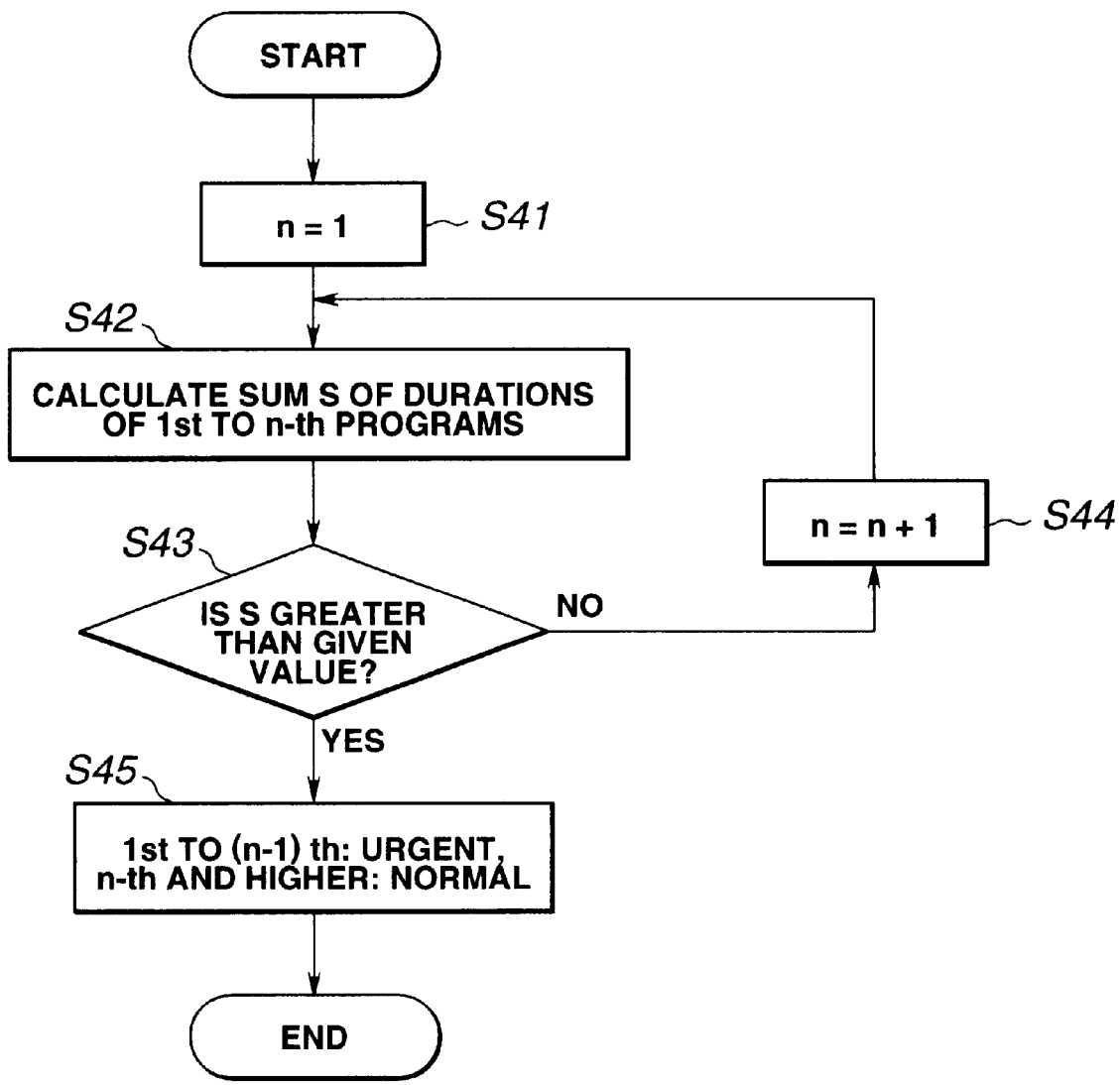
FIG. 9 is a flowchart of examining whether each video program is urgent or normal.

FIG. 9 is a flowchart of determining whether the video program of interest saved in the copy file 123 is an "urgent" program or a "normal" program. The procedure starts with the controller 16 calculating the duration of the video program flagged with the first priority (n=1) in the copy file 123 (Steps S41 and S42).

The controller 16 examines whether or not the duration is greater than a reference duration (Step S43) and if not, calculates a sum S of the durations of the video programs of the first and second priority listed in the copy file 123 (Steps S44 and S42). The reference duration is provided for classifying the video program to "urgent" and ""normal" when transmission from the cache server 5 and may arbitrarily be determined by settings of the operating unit 13.

More specifically, the controller 16 calculates the sum S of the durations of the video programs flagged with the first priority to the n-th priority listed in the copy file 123 (Steps S41 and S42) and increases the numeral n by one until the sum S exceeds the reference duration (Steps S43 and S44) for determining the numeral n when the sum S is greater than the reference duration.

The controller 16 when determining the numeral n assigns the video programs of the first to the (n−1)th priority as "urgent" and the video programs after the n-th priority as "normal" (Step S45).

FIG. 10 shows the copy file 123 in which the video files are classified into "urgent" and "normal" by the procedure from S41 to S45. As shown, the items "No.", "ID", and "Status" in the copy file 123 shown in FIG. 4 are specified. For example, the video programs Mat-01 to Mat-07 are classified as "urgent" and the video programs Mat-08 and higher are "normal". In FIG. 10, the two video programs Mat-A and Mat-B are inserted for modified transmission.

Then, referring to FIG. 11, a procedure of copying the video program from the main server to the video server in accordance with a list of the copy file where the video programs are assigned as "urgent" and "normal" will be explained. The procedure starts with the controller 16 producing the list in the copy file 123 indicative of "urgent" and "normal" as shown in FIG. 11 (Step S46) and moves to Step S47.

At Step S47, it is examined by the controller 16 whether the video program inserted is "urgent" or not and when "urgent", the procedure goes to Step S48. If not, the procedure advances to S51.

At Step S48, it is examined by the controller 16 whether the video program being copied from the main server 4 to the cache server 5 is "urgent" or not and when "urgent", the procedure goes to Step S49. If not, the procedure jumps to S50.

At Step S49, it is examined by the controller 16 whether or not the video program inserted has a higher priority than the video program being copied and when so, the procedure moves to Step S50. If not, the procedure advances to S51.

At Step S50, the controller 16 delivers a copy interruption signal to the copy manager 2 to stop the copying from the main server 4 to the cache server 5. Then, the controller 16 delivers the copy demand signal to the copy manager 2 for directing the main server 4 and the cache server 5 to start the copying of the video signal inserted.

When it is judged at Step S47 that the video program inserted is not "urgent" or at Step S49 that the priority of the video program inserted is not higher than that of the video program being copied, the copying action under way by the controller 16 is continued. After completion of the copying, the controller 16 directs the main server 4 and the cache server 5 to start the copying of the video signal inserted. After the copying of the video program inserted is completed, the action is returned to normal copying of the video programs with the order of priority.

For example, if the video program Mat-A is inserted during the copying of the video program Mat-06 as shown in FIG. 10, the copying of Mat-06 is interrupted and the copying of Mat-A is commenced.

Even if the video program Mat-B is inserted during the copying of the video program Mat-14, the copying of Mat-14 is continued. The copying of Mat-B is commenced when Mat-14 has been copied.

As set forth above, according to the present invention, when a video program is additionally inserted for transmission from the cache server 5, it is examined whether it is "urgent" or "normal" and when it is judged as "urgent", the copying action under way is interrupted and the inserted video program is copied.

If the inserted video program is "normal", the copying action under way is not interrupted regardless of the video program being copied having a lower priority than the inserted video program. The inserted video program is copied only after the copying action is completed. The interruption of the copying action causes the main server 4 to repeat a cue-up action of the existing video program even if already done. In "normal" mode, the order of priority may discourage the copying action under way. Particularly in LMS, it is a considerable loss of time to repeat the thread and eject of tape cassette.

A procedure of, when the hard disk 51 in the cache server 5 consumes up the copy area, deleting less significant ones of the video programs will be explained referring to FIGS. 12 to 16 as well as FIG. 1.

Figure 12:
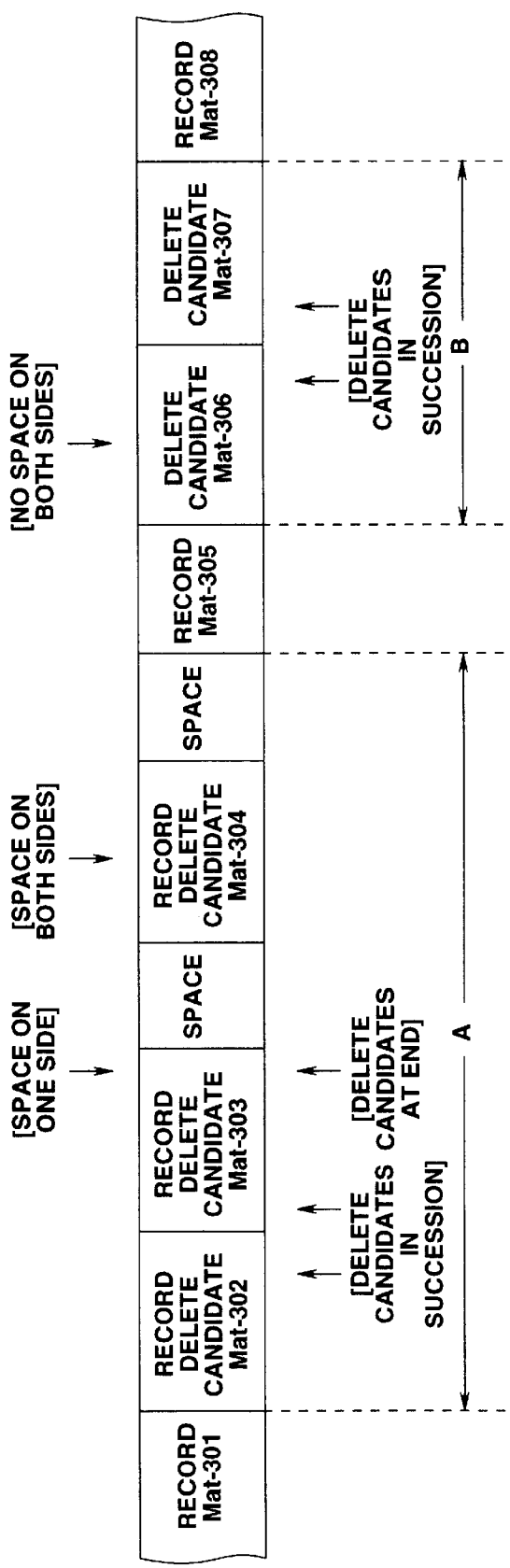
FIG. 12 is an explanatory view showing video programs saved on a hard disk in the cache server.

It is assumed, as shown in FIG. 12, that the hard disk 51 in the cache server 5 has the video programs Mat-301, 302, and 303 saved in a succession and Mat-304 spaced from them. Also, the video programs of Mat-305, 306, 307, and 308 are saved on the hard disk 51 as spaced from the previous programs.

Figure 13:
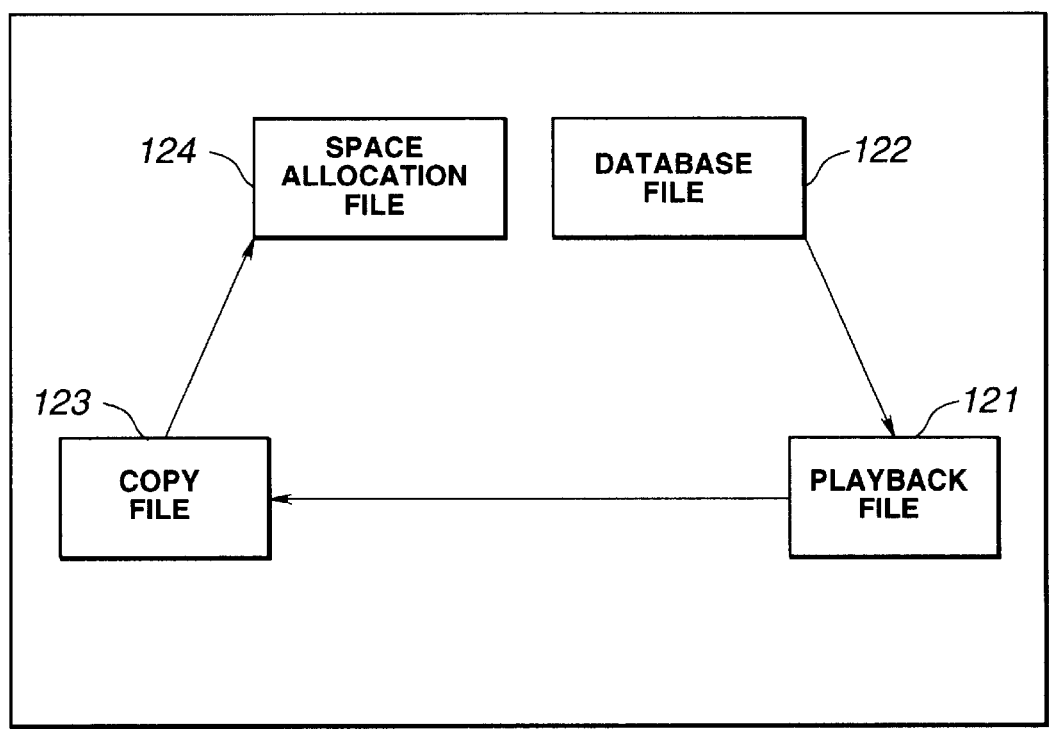
FIG. 13 is a diagram for constructing a space allocation file.

In the control PC 1, the controller 16 constructs a space allocation file (referred to as a space file 124 hereinafter) in the memory 12 for selection of less significant ones of the video programs saved in the hard disk 51 as shown in FIG. 13. More specifically, the controller 16 selects as a "deletion candidate" a group of the video programs which are less significant in the priority or transmitted later as defined by the copy file 123. The deletion candidate is checked according to a procedure starting from S61 shown in FIGS. 14 and 16 to be listed in the space file 124 and then deleted.

Figure 14:
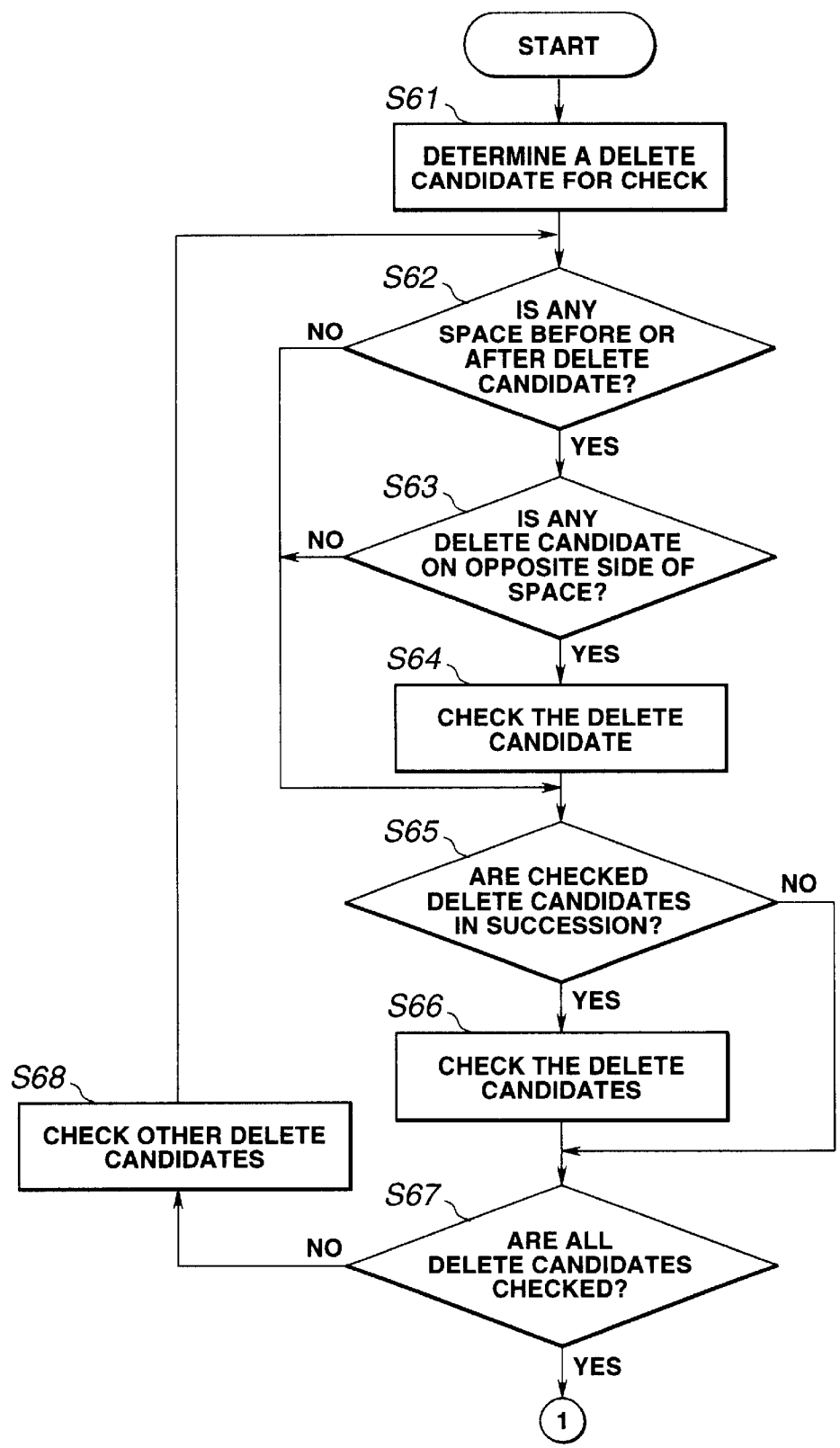
FIG. 14 is a flowchart of deleting a video program.
Figure 15:
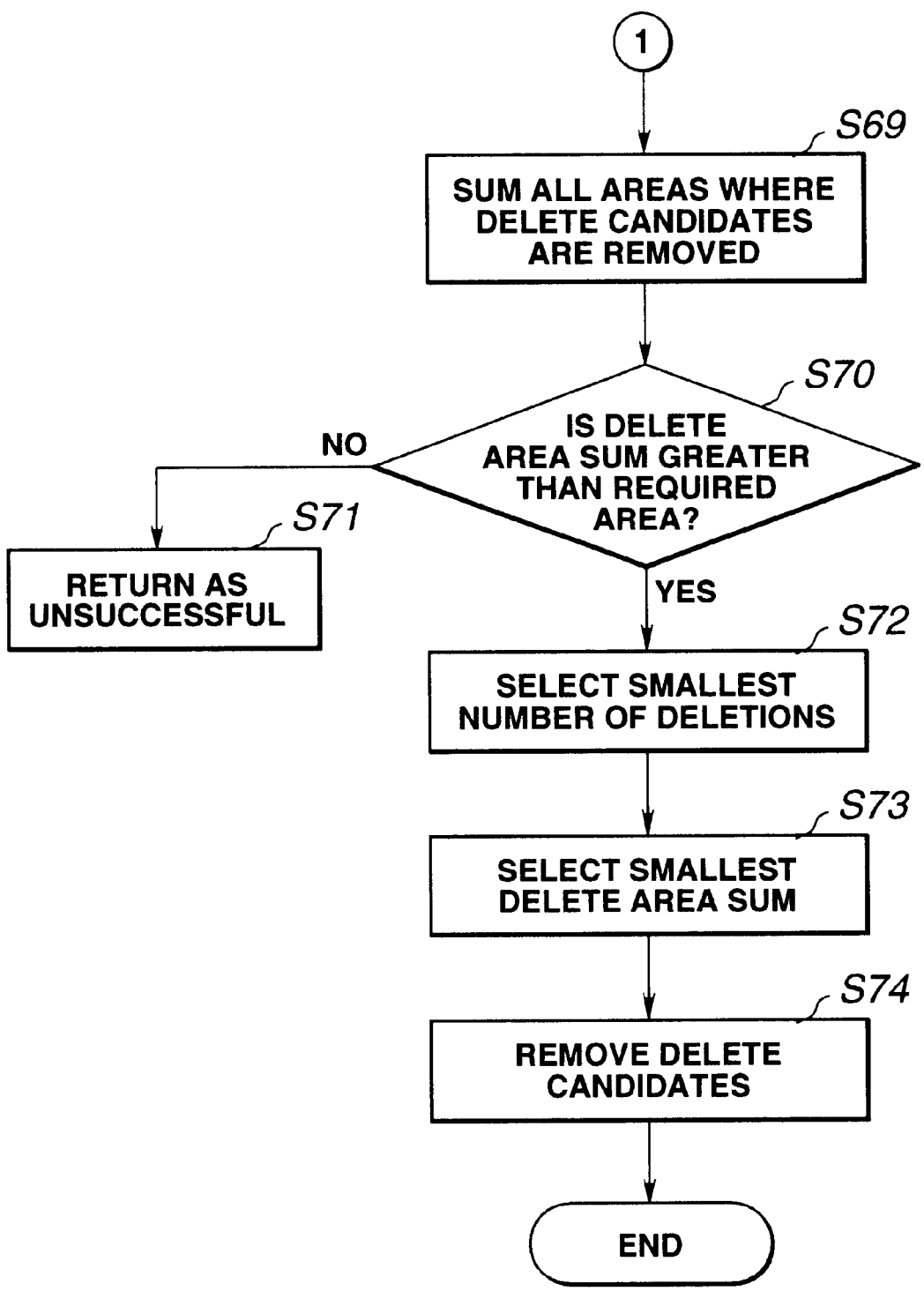
FIG. 15 is a flowchart of deleting the video program.

A procedure of operating the control PC 1 to delete the selected video programs will be explained referring to FIGS. 14 and 15.

The procedure starts with Step S61 for allowing the controller 16 to select one of the video programs in the copy file 123 (e.g. which has the lowest priority) to be deleted and Step S62 follows.

At Step S62, it is examined by the controller 16 whether or not there is an unused space at either the front or rear side of the delete candidate. When yes, the procedure goes to Step S63 and if not, to Step S65. The unused space located at either side of the deletion candidate may be found by referring the database file 122. For example, when the video program to be checked is Mat-303 or Mat-304 allocated next to the unused space as shown in FIG. 12, the procedure goes to Step S63. When the video program to be checked is Mat-302 not adjoined with the unused space, the procedure moves to Step S65.

At Step S63, it is examined by the controller 16 whether or not the deletion candidate exists on the opposite side of the unused space. When so, the procedure goes to Step S64. If not, the procedure moves to Step S65.

The deletion candidate located on the opposite side of the unused space is determined to be checked at Step S64 by the controller 16 and Step S65 follows.

At Step S65, it is examined by the controller 16 whether or not the deletion candidate to be checked is adjoined with another deletion candidate. When so, the procedure goes to Step S66. If not, the procedure moves to Step S67.

The another deletion candidate is determined to be checked at Step S66 by the controller 16 and Step S67 follows. For example, if the video program Mat-302 is to be checked, its neighbor Mat-303 is also checked.

At Step S67, it is examined by the controller 16 whether all the deletion candidates have been checked or not. When so, the procedure goes to Step S69 shown in FIG. 15 and if not, to Step S68.

At Step S68, the deletion candidate which has been unchecked is determined to be checked by the controller 16 and the procedure returns back to Step S62.

The controller 16 identifies the ID and a number of the deleted candidates in each delete area where the candidates have been deleted through carrying out Steps S61 to S68 and writes down "delete area", "deleted ID", and "number of deletions" in the space file 124 shown in FIG. 16.

After it is judged at Step S67 that all the candidates have been checked up, an extension of the delete area where all the deletion candidates have been deleted is checked, calculated, and written in the space file 124 by the controller 16 at Step S69. Then, the procedure goes to Step S70. As shown in FIG. 16, the area A where the three video programs Mat-302, 303, and 304 have been deleted is expressed by 24. The area A includes the two unused spaces adjoined to the three video programs shown in FIG. 12.

At Step S70, it is examined by the controller 16 whether or not the delete area is greater than the area required for saving copies of the video programs on the hard disk 51. When so, the procedure goes to Step S72 and if not, to Step S71.

At Step S71, the controller 16 identifies that the delete area is not large enough to save copies of the video programs on the hard disk 51 and returns its demand to the copy file 123. Upon receiving the demand, the copy file 123 flags an error on the video program to be copied. For compensation, additional deletion can be proceeded by the user operating the operating unit 13. This causes the controller 16 to return to Step S61 and repeat the procedure. The addition of deletion candidates may be executed by an automatic operation of the controller 16.

When it is judged at Step S70 that the delete area is greater than the area required for saving, the procedure goes to Step S72 where the controller 16 refers the space file 124 to select a delete area in which the number of candidates is smallest and Step S73 follows.

The smallest of the delete area is determined by the controller 16 at Step S73 and the procedure moves to Step S74.

At Step S74, the controller 16 directs via the controller 52 the hard disk 51 to delete the deletion candidates in the delete area selected. For example, when the delete area A is selected, the video programs Mat-302, 303, and 304 are deleted.

As set forth above, according to the present invention, when the hard disk 51 has no space for saving copies of the video programs, its saved video programs are deleted in the order of latest transmission. As such a waste action as deleting video programs to be transmitted earlier and saving copies of them again is avoided, arithmetical operations will be carried out smoothly.

Also, the memory 12 includes the space file 124 along with the playback file 121 and the copy file 123, hence eliminating the need of processing bulky data about transmission and deletion of the video programs saved in the hard disk 51 and contributing to the simplicity of the system arrangement.

Figure 18:
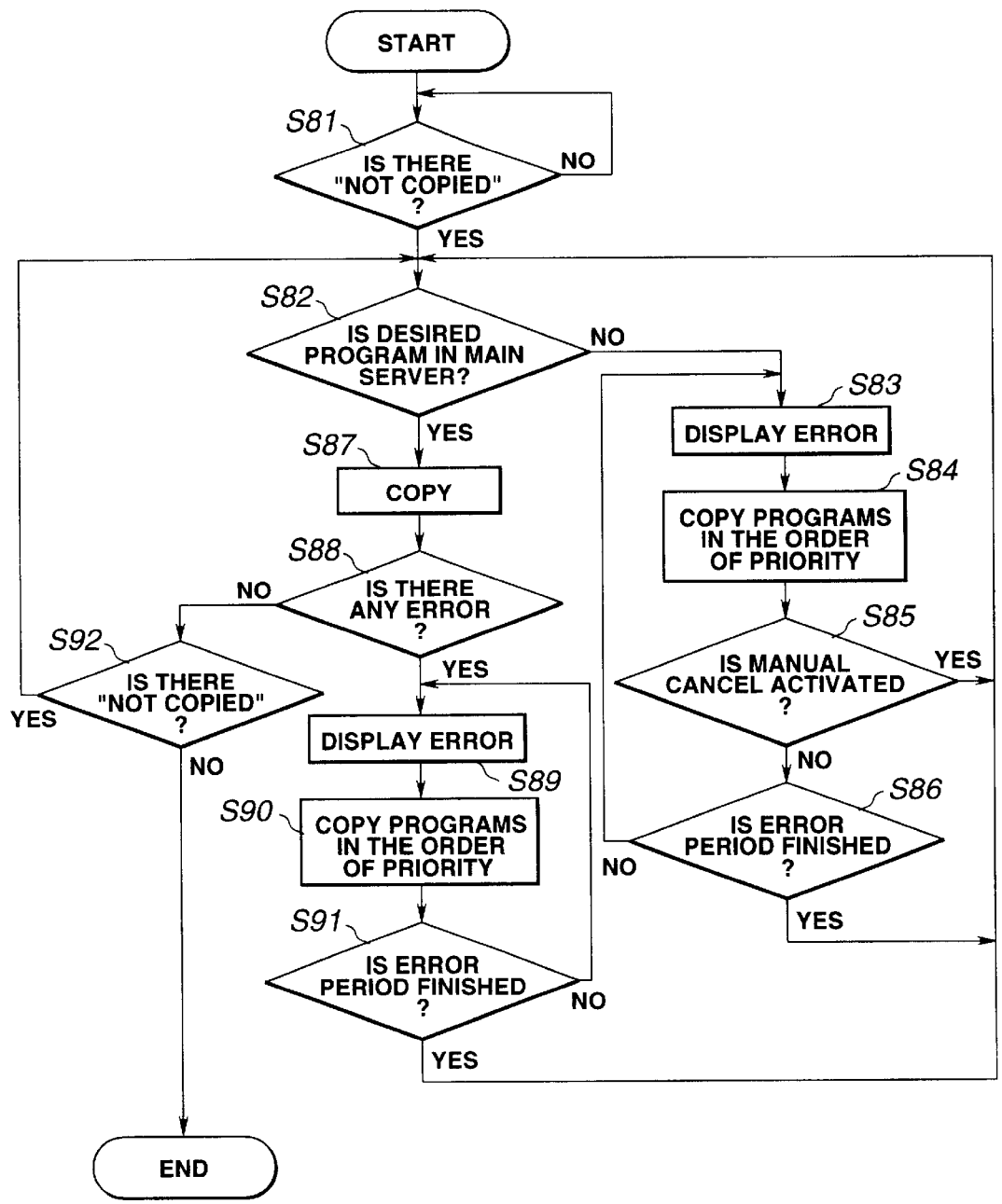
FIG. 18 is a flowchart showing response to a copy error.

A procedure of, when an error occurs in copying the video program from the main server 4 to the cache server 5, continuing the copying of the video program without delay will be explained referring to FIGS. 17 to 19.

According to the present invention, the copying of video programs from the main server 4 to the cache server 5 is automatically performed in the order of given priority defined by the copy file 123 shown in FIG. 17. More particularly, the video programs copied from the main server 4 to the cache server 5 in the order of priority (of earlier transmission from the cache server 5) defined by the copy file 123 and if a change in the transmission order is made or a fault in the hardware is found, the copying in the order of priority remains unchanged.

However, the repeat (or retry) of the copying action due to a fault in the hardware such as the library 3 or the main server 4 or the absence of a desired video program in the main server 4 will delay the copying of the other video programs. For overcoming such a copying trouble, a procedure according to the present invention is provided starting from Step S81 as shown in FIG. 18.

At Step S81, it is examined by the controller 16 of the control PC 1 whether or not the copy file 123 includes "not copied" shown in FIG. 17, i.e. there is any video program to be copied. When so, the procedure goes to Step S82 and if not, it stays at Step S81. FIG. 17 illustrates a schematic diagram of the copy file 123.

At Step S82, it is examined by the controller 16 whether or not the first (or highest priority) of the video programs to be copied is stored in the hard disk 41 of the main server 4. When so, the procedure goes to Step S83 and if not, to Step S87. As the library 3 carries data of the video programs stored in the hard disk 41, it can be accessed via the copy manager 2 by the controller 16 to examine the storage of the first of the video programs to be copied in the hard disk 41.

At Step S83, the controller 16 writes down "copy error 1" in "STATUS" of the video program Mat-C shown in FIG. 17. The term "copy error 1" indicates a copy error generated by the absence of the desired video program in the hard disk 41 of the main server 4. After the controller 16 directs the monitor 14 to display the copy file 123 stating "copy error 1", the procedure moves to Step S84. Accordingly, the absence of the desired video program in the hard disk 41 can visually be noticed to the user.

At Step S84, the controller 16 delivers the copy demand signal via the interface 15 and the copy manager 2 to the library 3 for copying the video programs after Mat-C in the order of priority from the main server 4 to the cache server 5 and Step S85 follows. More specifically, the video programs Mat-C is skipped and the succeeding video programs are normally copied in the order of priority defined by the copy file 123. This prevents the repeat of copying Mat-C and thus delay of the copying action.

At Step S85, it is examined by the controller 16 whether a manual canceling action. with the operating unit 16 is executed or not. When the manual canceling is executed, the procedure returns back to Step S82 and if not, moves to Step S86. The manual canceling is to forcibly cancel the display of an error.

At Step S86, it is examined by the controller 16 whether a particular length of error period has passed or not. It is assumed that the error period is set to one hour from the acknowledgment at Step S82 of the absence of the video program in the hard disk 41 of the main server 4. The error period of one hour is determined considering that when the retry of copying action is made within a shorter period, the generation of a copy error is inevitable because of the absence of the desired video program in the main server 4. The error period which is generously lengthened to one hour permits the user to file (or register) the desired video program not stored in the main server 4 and eliminate the copy error. When it is judged by the controller 16 that the error period has passed, the skip of the video program is canceled and the procedure returns back to Step S82. If not, Step S83 follows.

In case that the desired video program is not stored in the main server 4, the routine from S83 to S86 is performed while the error period lasts. When the error has been removed by the user, the routine is terminated by the manual canceling action at Step S85.

When it is judged at Step S82 that the first video program is stored in the hard disk 41 of the main server 4, the copy demand signal is delivered at Step S87 from the controller 16 via the interface 15 and the copy manager 2 to the library 3. The library 3 directs the main server 4 to transfer copies of the video programs to the cache server 5 in the order of priority and Step S88 follows.

As the result, the copies of the desired video programs are saved in the cache server 5. When the copying action has been completed, the copy manager 2 delivers the end-of-copy signal to the control PC 1.

When it is judged at Step S88 by the controller 16 that a copy error occurs or the end-of-copy signal is not released from the copy manager 2 after a given period, the procedure goes to Step S89. When the end-of-copy signal is released from the copy manager 2, the procedure moves to Step S92.

At Step S89, the controller 16 writes "copy error 2" in "STATUS" of the video program Mat-E shown in FIG. 17. The term "copy error 2" indicates a fault in the hardware such as the hard disk 41. The controller 16 directs the monitor 14 to display the copy file 123 stating "copy error 2" and Step S90 follows. This allows the user to visually acknowledge the occurrence of a fault in the hardware such as the hard disk 41.

At Step S90, the copy demand signal is delivered from the controller 16 via the interface 15 and the copy manager 2 to the library 3 to copy the video programs after Mat-E in the order of priority from the main server 4 to the cache server 5 and the procedure goes to Step S91. More specifically, the video program Mat-E is skipped and the succeeding video programs are normally copied in the order of priority defined by the copy file 123. This prevents the repeat of copying Mat-E and thus delay of the copying action.

At Step S91, it is examined by the controller 16 whether a particular length of error period has passed or not. It is assumed that the error period is set to ten minutes from the judgment at Step S88 that the end-of-copy signal is not released from the copy manager 2 after a period. The error period of ten minutes is determined considering that this type of copy error may be eliminated by repeating the copying action or by simple inspection and treatment of the hardware. When it is judged by the controller 16 that the error period has passed, the procedure returns back to Step S82. If not, Step S89 follows.

The error produced during the copying action at Step S87 results from a fault in the hardware such as the library 3 or the hard disk 41. This type of error may occur in copying the other video programs but can simply be eliminated by inspecting and repairing the hardware. The error is hence denoted by "copy error 1" related to the error period of a shorter duration as shown in FIG. 19.

When it is judged at Step S88 that the end-of-copy signal is released from the copy manager 2, the controller 16 examines at Step S92 whether or not there is any video program flagged with "not copied" in the copy file 123. When so, the procedure returns back to Step S82 and if not, it is terminated.

As set forth above, according to the present in, when any error occurs in copying a video programs from the main server 4 to the cache server 5, the error period is given for copying the succeeding video program without repeating the copying of the video program. The error period is adjusted depending on the type of the error, hence allowing the copying of the succeeding video program without delay.

A procedure of adjusting the start and end of a video program saved in the cache server 5 in a wider range will be explained referring to FIGS. 20 and 21 as well as FIG. 1.

The hard disk 51 of the cache server 5 carries a copy of the video program stored in the main server 4. Also, the database file 122 of the control PC 1 includes the start and the end of each video program. According to the present invention, the video program can easily be trimmed to determine its start and end.

The trimming is made through clicking with the mouse 13a a desired point in a trimming window displayed on the monitor 14 or entering corresponding numerals with the keyboard 13b.

Figure 20:
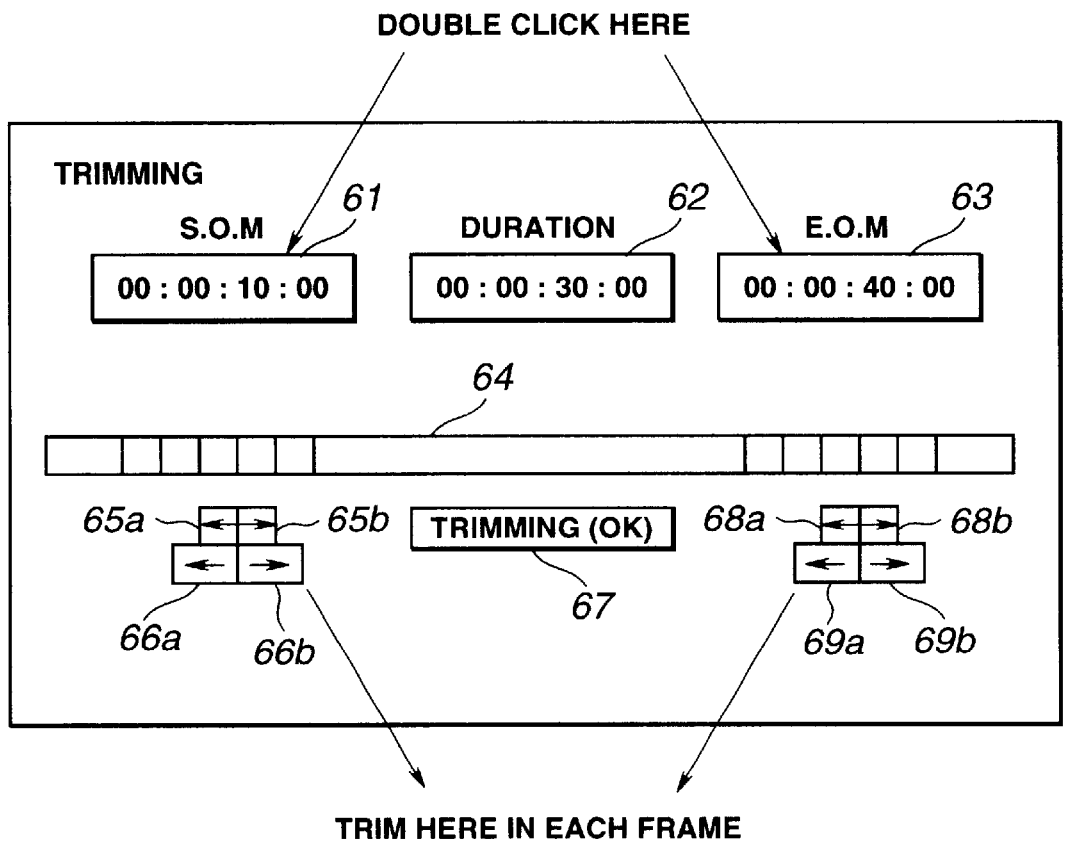
FIG. 20 is an explanatory view showing a trimming window.

The trimming window may include, as shown in FIG. 20, a SOM window 61 indicating the start of a video program, a duration window 62 indicating a duration period of the program, an EOM window 63 indicating the end of the program, and a trimming bar 64 indicating the SOM and EOM of a trimmed video program.

The trimming window may also be provided with left-ward scroll buttons for SOM 65a and 66a, rightward scroll buttons for SOM 65b and 66b, an OK button 67, leftward scroll buttons for EOM 68a and 69a, and rightward scroll buttons from EOM 68b and 69b.

Figure 21:
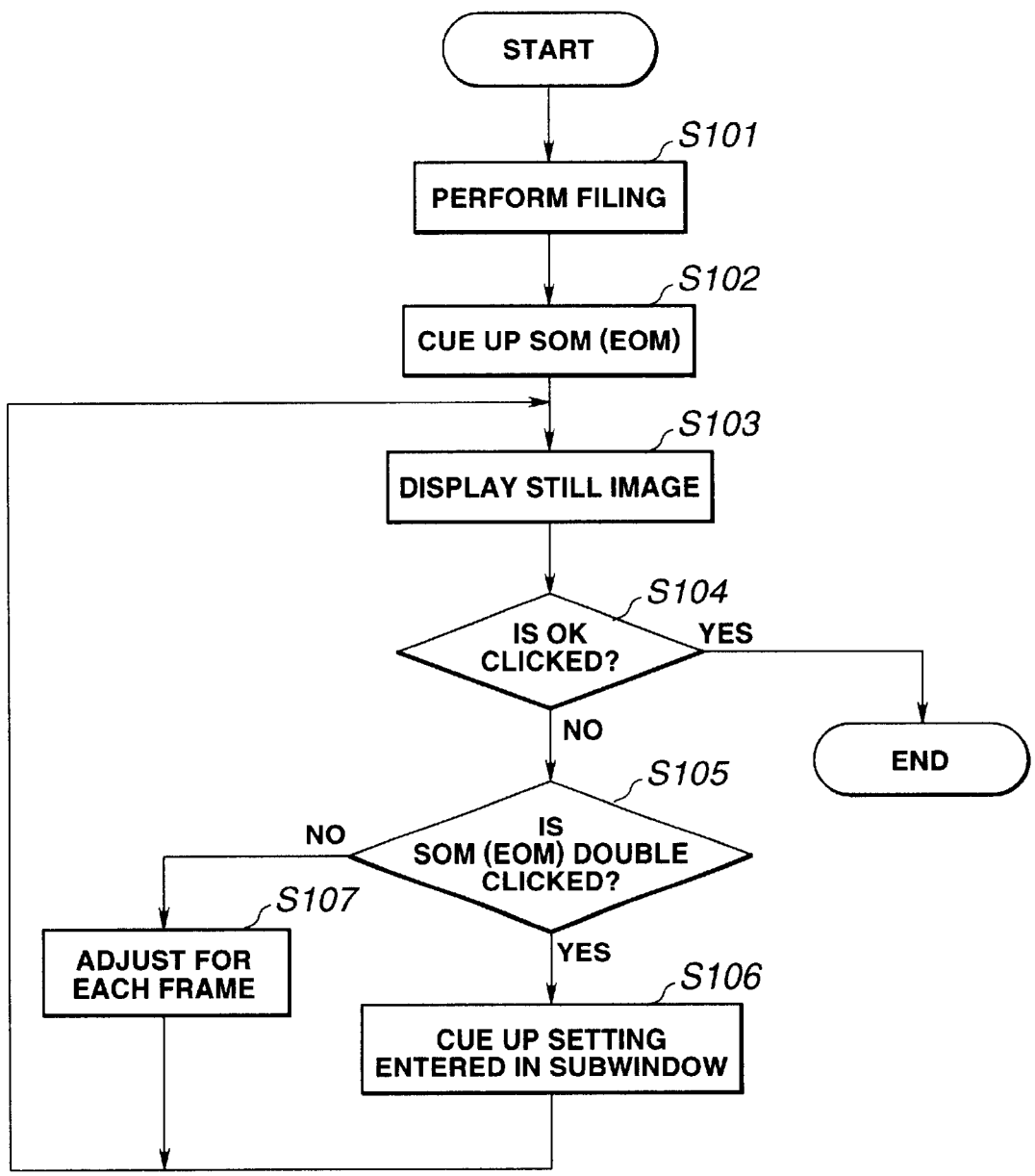
FIG. 21 is a flowchart of performing the trimming.

The trimming is executed by a routine starting from Step S101 as shown in FIG. 21.

At Step 5101, the filing is performed and Step S102 follows. The filing includes playing back a video signal with e.g. a video tape recorder and recording it on a hard disk in synchronization with the playing back. The copying of the video programs from the main server 4 to the cache server 5 is hence regarded as the filing.

The controller 16 of the control PC 1 cues up the SOM (or EOM) of the video program according to the data of the database file 122 and Step S103 follows.

The hard disk 41 is controlled via its controller 42 by the controller 16 at Step S103 to display an image at SOM of the video program and then, the procedure moves to Step S104. As the result, the image at SOM is displayed on the monitor 53.

It is then examined at Step S104 by the controller 16 whether or not the OK button 67 is clicked with the mouse 13a. When so, the trimming is terminated and if not, the procedure goes to Step S105. More particularly, the controller 16 registers the setting of SOM or EOM to the database file 122 and terminates the trimming procedure.

At Step S105, it is examined by the controller 16 whether or not the SOM window 61 (or the EOM window 63) is double clicked. When so, the procedure moves to Step S106 and if not, to Step S107.

Figure 22:
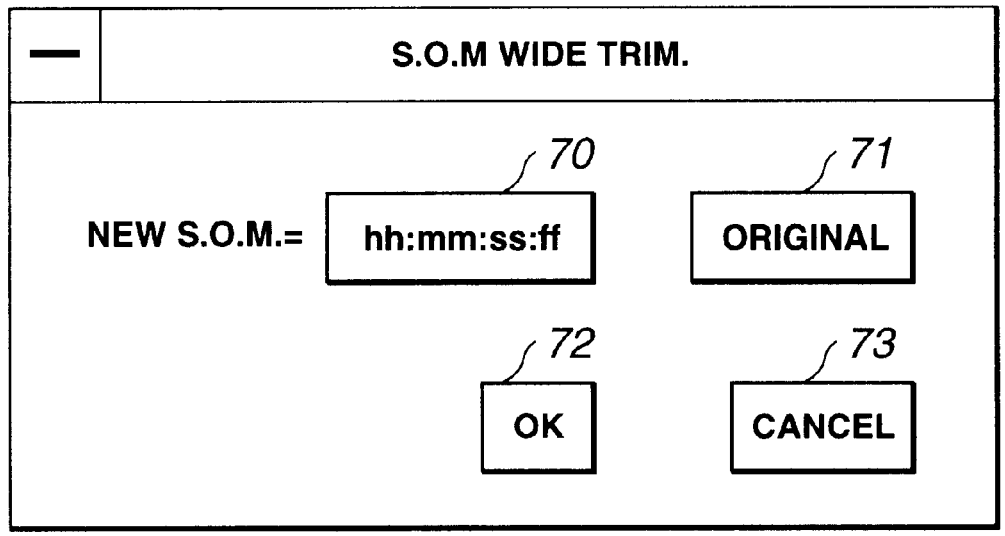
FIG. 22 is an explanatory view showing an SOM wide trimming window.

At Step S106, the controller 16 allows the monitor 14 to display a subwindow or an SOM wide trimming window as shown in FIG. 22.

The SOM wide trimming window may include a new SOM window 70 to which a new setting of SOM is entered through the numerical input of the keyboard 13b, an original button 71, an OK button 72, and a cancel button 73.

For example, when the original button 71 is clicked, the controller 16 accesses the database 122 to display an original setting of SOM in the new SOM window 70. When the OK button 72 is clicked, the controller 16 registers a newly entered data in the new SOM window 70 as the setting of SOM to the database file 122. When the cancel button 73 is clicked, the SOM wide trimming window is erased and the trimming window shown in FIG. 20 is displayed again.

Figure 23:
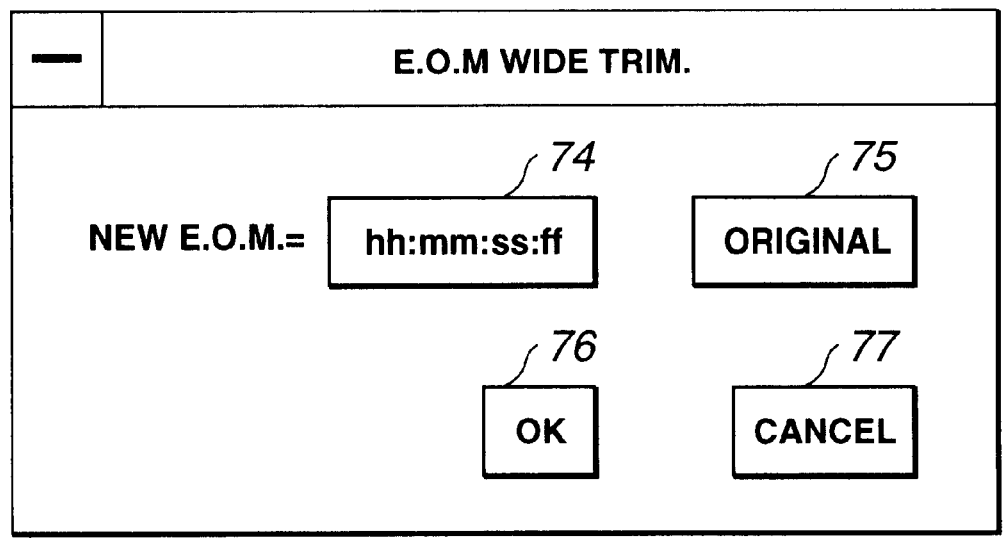
FIG. 23 is an explanatory view showing an EOM wide trimming window.

When the EOM window 63 is double clicked at Step S105, the controller 16 displays an EOM wide trimming window on the monitor 14. As shown in FIG. 23, the EOM wide trimming window may be similar to the SOM wide trimming window shown in FIG. 22, including a new EOM window 77 to which a new setting of EOM is entered through the numerical input of the keyboard 13b, an original button 75, an OK button 76, and a cancel button 77. The response of the controller 16 to the clicking on each button is identical to that of the SOM wide trimming window.

In response to a new setting of SOM in the new SOM window 70 and clicking of the OK button 72, the controller 16 cues up the SOM and its procedure returns back to Step S103. The setting of SOM to be entered through the new SOM window 70 is not limited to an approximate to the original setting but may be an arbitrary value.

If no double click is made at Step S105, the controller 16 adjusts the setting of SOM in response to clicking actions with the mouse 13a and Step S103 follows.

For example, when the scroll button 65a is clicked, the setting of SOM is shifted to a setting at the preceding frame by the controller 16. When the scroll button 65b is clicked, the setting of SOM is shifted to a setting of the succeeding frame. Equally, when the scroll button 66a is clicked, the setting of SOM is shifted by the controller 16 to a setting at the frame preceding the current frame by ten frames. When the scroll button 66b is clicked, the setting of SOM is shifted to a setting of the frame succeeding by ten frames. Also, when the scroll button 68a, 68b, 69a, and 69b are clicked, the controller 16 adjusts the setting of EOM by the same manner as with the scroll buttons 65a, 65b, 66a, and 66b clicked respectively.

As set forth above, according to the present invention, the setting of SOM or EOM determined by the user can be viewed in the form of a still image on the monitor and registered in the database file 122 by repeating the procedure from S103 to S107.

Accordingly, if the start of the video program stored in the main server 4 does not coincide with the start time of recording, it can readily be corrected.

Also, when more than one of video programs are saved in a succession in the cache server 5, any of them can be picked up and transmitted since its start and end times have been registered to the database file 122.

Figure 24:
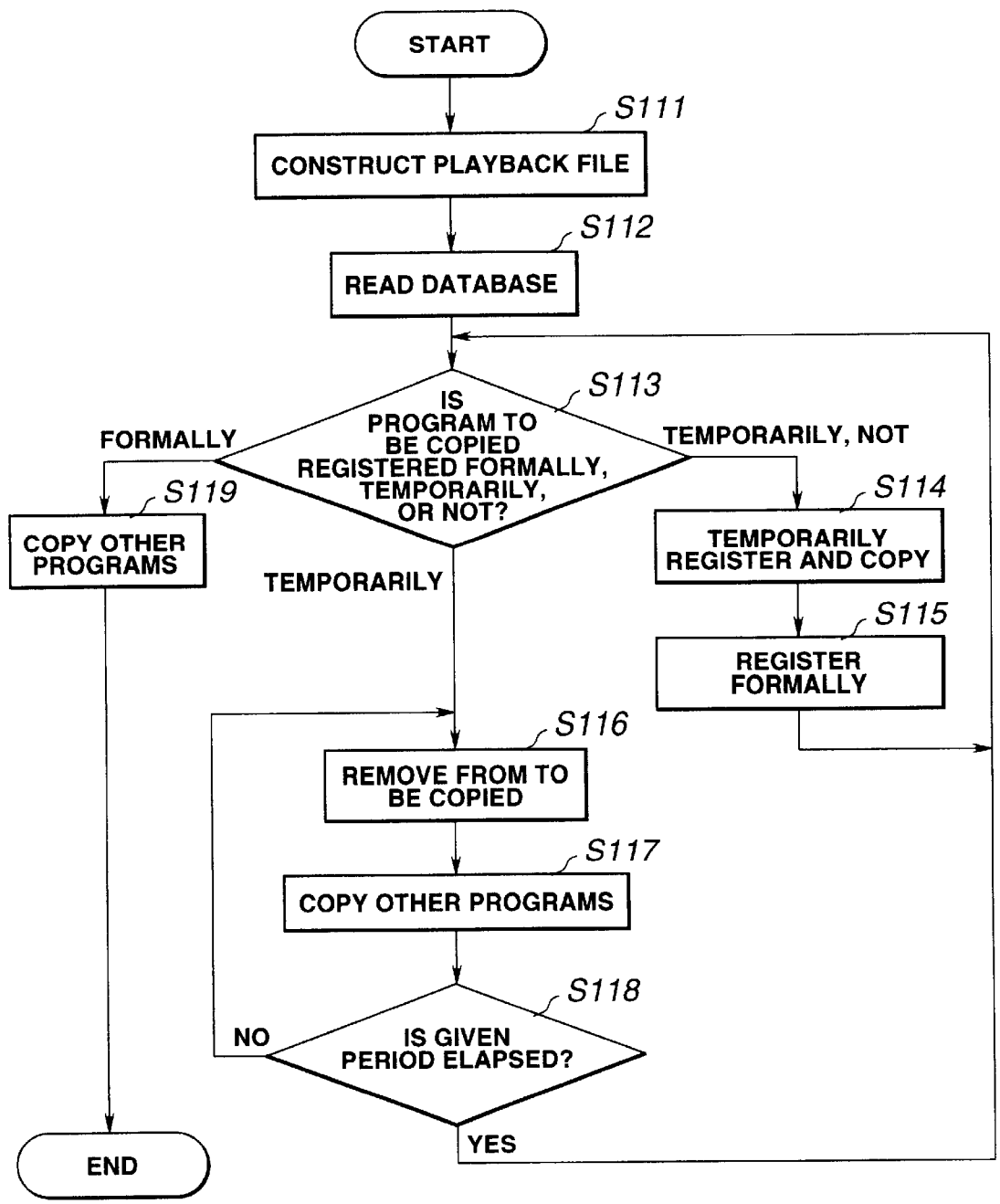
FIG. 24 is a flowchart of performing a copying action in the cache server with a plurality of channels.
Figure 25:
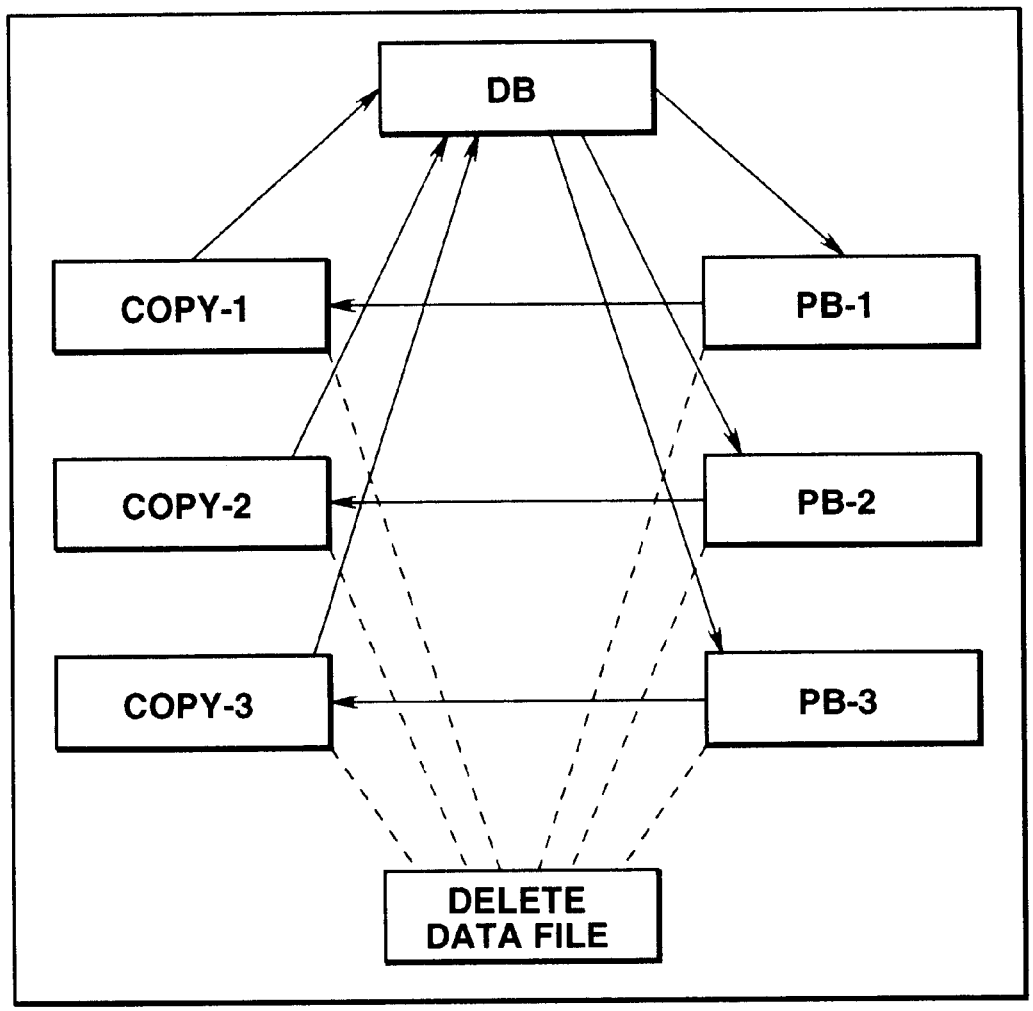
FIG. 25 is a diagram for constructing a delete file.

A procedure of copying a desired video program to the cache server 5 with a plurality of channels not overlapped will be explained referring to FIGS. 24 to 26 as well as FIGS. 1 and 6.

Figure 6:
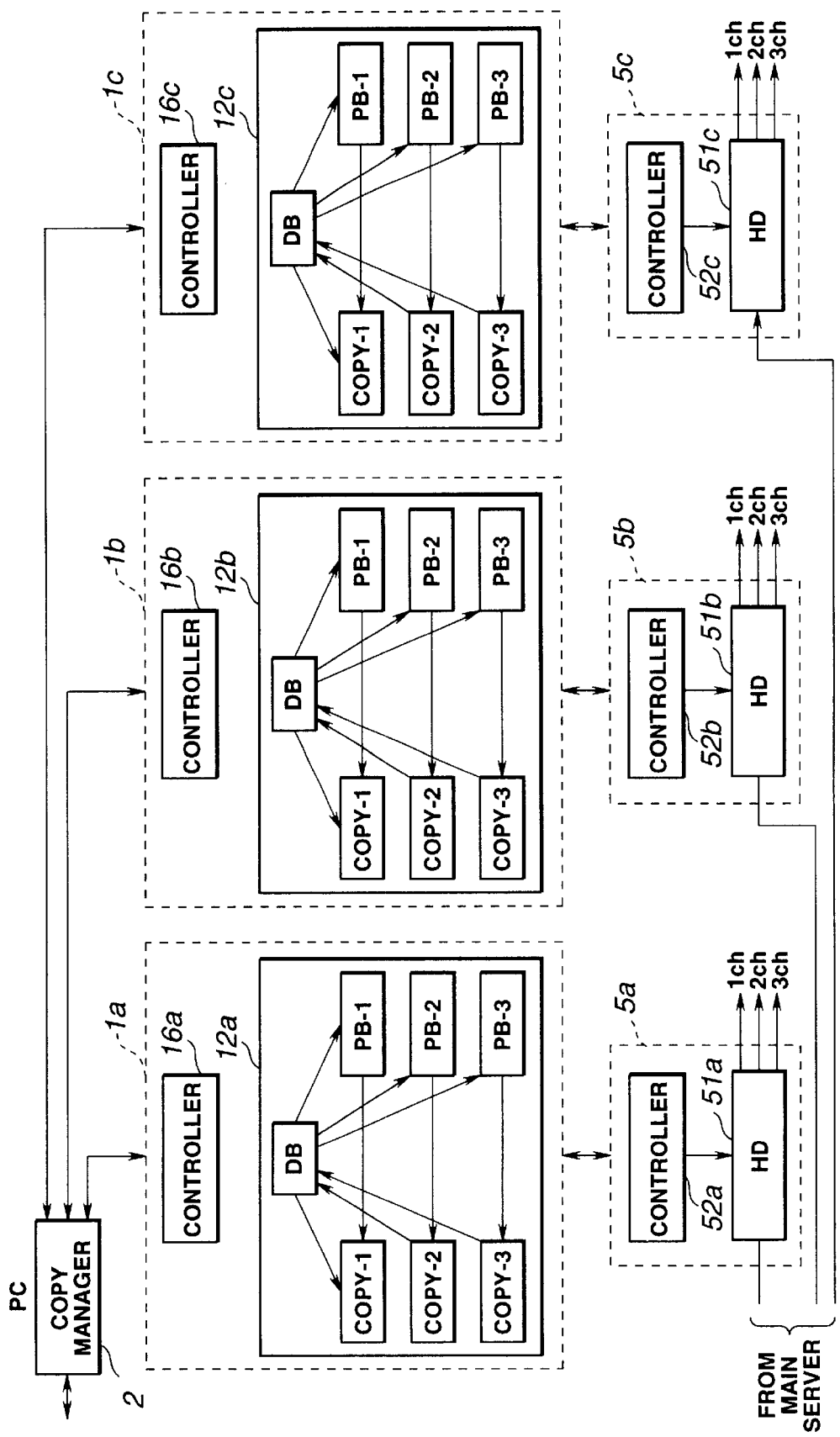
FIG. 6 is a block diagram of the automatic copy system provided with a plurality of cache servers and a plurality of channels showing another embodiment of the present invention.

As shown in FIG. 6, the copy files COPY1, COPY2, and COPY3 in the control PC 1 are separated and assigned to three, first to third, channels of the hard disk 51a. With the hard disk 51a having a group of the channels, it may be conducted by the controller 16 to copy the video program Mat-X to the cache server 5 according to the copy file COPY1 while copying the same program Mat-X according to the other copy file COPY2. A routine of the controller 16 starting from Step S111 is shown in FIG. 24 for preventing such an overlap copying action.

At Step S11, the controller 16 in response to external data constructs the playback file PB1 or modifies the playback file PB1 when a change of transmission is introduced and Step S112 follows.

At Step S112, the controller 16 accesses the database DB to read a desired video program specified by the playback file PB1 and Step S113 follows.

It is examined at Step S113 by the controller 16 whether the video program is not registered, temporarily registered, or formally registered. When it is determined that the program is not registered, temporarily registered, or formally registered, the procedure goes to Steps S114, S116, or S119 respectively. The formally registered video programs means that the video program has been copied in the cache server 5a and its copying has been registered in the database DB. The temporarily registered video program means that the video program has been copied to the cache server 5a. The unregistered video program means that the video program has not been copied to the cache server 5a and is not being copied.

The controller 16 temporarily registers the video program to the database DB and delivers the copy demand signal to the copy manager 2 at Step S114 and Step S115 follows. Accordingly, a copy of the video program of interest has been transferred from the main server 4 to the cache server 5 and saved in the cache server 5.

At Step S115, the controller 16 acknowledges that the copying has been completed, formally registers the video program to the database DB, accesses the copy file COPY1 to identify another video program to be copied before its procedure is returned back to Step S113. If any copy error occurs, the temporarily registered program is immediately canceled without being formally registered and the procedure goes back to Step S113.

When the video program is judged as a temporarily registered one at Step S113, it is removed by the controller 16 from the list of the video programs to be copied at Step S116. More specifically, the temporarily registered video program is skipped and the procedure goes to Step S117.

At Step S117, the controller 16 performs copying the other video programs in the order of priority defined by the copy file COPY1 and Step S118 follows.

It is examined at Step S118 by the controller 16 accessing the database DB whether a particular length of time after the video program was temporarily registered has passed or not. When so, the procedure returns back to Step S113 and if not, to Step S116. As the result, while a video program is being copied in one channel, another video program can be copied in another channel thus preventing overlap of copying actions. The length of time mentioned above extends from Step S114 to the end of Step S115.

When it is judged at Step S113 that the video program is formally registered, the controller 16 allows the other video program to be copied in the order of priority defined by the copy file COPY-1 at Step S119 and then terminates its procedure.

As set forth above, according to the present invention, while one video program is being copied on the cache server 5a having a plurality of channels, it is temporarily registered. This prevents overlap of copying the same video program.

In case that there is no space in the hard disk 51 for saving the video program, some less significant video programs are deleted from the hard disk 51. However, such less significant video program determined by one copy file, e.g. COPY1, may be regarded as of higher priority in another copy file, e.g. COPY2 and if deleted, have to be copied back. For compensation, a delete data file is provided in the memory 12 for selecting less significant video programs through reviewing the order of priority in each copy file, as shown in FIG. 25.

Referring to FIG. 26, the delete data file includes data of the playback files PB1, PB2, and PB3 showing transmission of the video programs from the cache server 5 along their respective channels. In this embodiment, deletion is not allowed within a given length of time which is a sum of the durations of the highest priority video programs in each playback file PB.

More particularly, the routine from Step S41 to Step S45 shown in FIG. 9 is executed for each playback file PB by the controller 16. At Step S45, the first to the (n−1)th of the video programs are not allowed to be deleted but the n-th and higher will be deletable. More specifically, the controller 16 assigns the n-th and higher video programs as deletable candidates and then performs from Step S61 to Step S74 shown in FIGS. 14 and 15. If the deletion is unsuccessful at Step S71, the setting is modified and then, the procedure is repeated from Step S61.

According to the present invention, in case of the cache server 5 having a plurality of channels, the above routine prevents any particular video program to be transmitted from being deleted by accident and recovered again through recopying, hence contributing to the high speed processing operation of the system.

It would be understood that the present invention is not limited to the above described embodiments but other changes and modifications in design are possible without departing from the technical spirits defined in the claims of the present invention. For example, although the cache server 5 having three different channels is explained, the number of channels is not of limitation and may arbitrarily be determined in combination with the playback files PB and the copy files COPY to be connected.

As set forth above, the method of image transmission according to the present invention permits copying of video programs from the main server to the cache server in a modified order of priority for efficiency when the transmission of the video programs has been changed from one order to another and the copying is needed.

In the method of image transmission, when a video program of interest is urgently requested to be transmitted earlier than the current video program being copied to the cache server, the copying of the current video program is canceled and the video program of interest can be copied at priority.

What is claimed is:

1. A method of transmitting programs, each comprising a group of data, stored in a first saving means and copied to a second saving means before being distributed from the second saving means, comprising the steps of:

saving a database file including data of programs copied to the second saving means, a playback file including data of transmission of the programs stored in the second saving means, and a copy file specifying programs in the order of transmission listed in the playback file but not saved in the database file;

transferring to the first saving means a first copy demand for copying the programs specified by the copy file;

copying the programs from the first saving means to the second saving means in response to the first copy demand;

when the playback file is changed, examining whether the program specified by the copy file is to be transmitted on an urgent basis;

when a program added and/or modified is to be transmitted on an urgent basis and before a current program being copied to the second saving means, transmitting to the first saving means a second copy demand for interrupting copying of the current program and then copying the program added and/or modified on an urgent basis;

when a program added and/or modified is to be transmitted on an urgent basis and before a current program being copied to the second saving means, transferring to the first saving means a second copy demand for interrupting copying of the current program and then copying the program added and/or modified on a priority basis; and copying the program added and/or modified from the first saving means to the second having means in response to the second copy demand.

2. The method of transmitting programs according to claim 1, further comprising the step of, when the program added and/or modified is to be transmitted on an urgent basis but not before the current program being copied to the second saving means, delivering a third copy command to the first saving means for copying the programs from the first saving means to the second saving means in the order of transmission from the second saving means.

3. The method of transmitting programs according to claim 1, further comprising the step of, when the program added and/or modified is to be transmitted on a non-urgent basis, delivering a fourth copy command to the first saving means for copying the programs from the first saving means to the second saving means in the order of transmission from the second saving means.

4. The method of transmitting programs according to claim 1, further comprising the step of calculating a sum of recording durations of respective programs specified by the copy file and saved in the second saving means in the order of transmission and when the calculated sum is smaller than a reference value, the programs are to be transmitted on an urgent basis.

5. The method of transmitting programs according to claim 1, further comprising the step of updating the copy file at equal intervals of time according to the database file and the playback file.

6. An apparatus for transmitting programs, each comprising a group of data, stored in a first saving means and copied to a second saving means before being distributed from the second saving means, comprising:

memory means for saving a database file including data of the programs stored in the second saving means for saving a playback file including data of transmission of the programs stored in the second saving means, and for saving a copy file indicative of programs in order of transmission listed in the playback file but not saved in the database file;

demand transferring means for transferring to the first saving means a first copy demand for copying the programs specified by the copy file; and controlling means for controlling copying of the programs from the first saving means to the second saving means in response to the first copy demand, in which the demand transferring means is actuated, when a program added and/or modified is to be transmitted on an urgent basis from the second saving means and before a current program being copied to the second saving means, for transferring to the first saving means a second copy demand for interrupting copying of a current program and copying the program added and/or modified on a priority basis and, in response to the second copy demand, the controlling means directs copying of the program added and/or modified from the first saving means to the second saving means.

7. The apparatus for transmitting programs according to claim 6, wherein the demand transferring means is actuated, when the playback file is changed and when the program added and/or modified is to be transmitted on an urgent basis but not before the current program being copied to the second saving means, to deliver a third copy command to the first saving means for copying the programs from the first saving means to the second saving means in an order of transmission from the second saving means and, in response to the third copy demand, the controlling means directs copying of the program added and/or modified from the first saving means to the second saving means.

8. The apparatus for transmitting programs according to claim 6, wherein the demand transferring means is actuated, when the program added and/or modified is to be transmitted on a non-urgent basis, to deliver a fourth copy command to the first saving means for copying the programs from the first saving means to the second saving means in the order of transmission from the second saving means and, in response to the fourth copy demand, the controlling means directs copying of the program added and/or modified from the first saving means to the second saving means.

9. The apparatus for transmitting programs according to claim 6, further comprising determining means for determining, when the playback file is changed, whether the program specified by the copy file is to be transmitted on an urgent basis.

10. The apparatus for transmitting programs according to claim 9, wherein the determining means calculates a sum of recording durations of respective programs specified by the copy file and saved in the second saving means in the order of transmission and when the calculated sum is smaller than a reference value, the determining means determines that the programs are to be transmitted [urgently] on an urgent basis.

11. The apparatus for transmitting programs according to claim 6, wherein the controlling means comprises means for updating the copy file at equal intervals of time according to the database file and the playback file.

* * * * *